United States Patent
Matsumura

(10) Patent No.: US 11,960,992 B2
(45) Date of Patent: Apr. 16, 2024

(54) WINDING CONDITION GENERATING APPARATUS, WINDING APPARATUS, WINDING DEFECT LEVEL PREDICTION VALUE GENERATING APPARATUS, WINDING CONDITION CALCULATING METHOD, WINDING METHOD, AND WINDING DEFECT LEVEL PREDICTION VALUE GENERATING METHOD

(71) Applicant: FUJIFILM Corporation, Tokyo (JP)

(72) Inventor: Yoshihito Matsumura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 874 days.

(21) Appl. No.: 17/025,069

(22) Filed: Sep. 18, 2020

(65) Prior Publication Data
US 2021/0004683 A1 Jan. 7, 2021

Related U.S. Application Data

(63) Continuation of application No. PCT/JP2019/012408, filed on Mar. 25, 2019.

(30) Foreign Application Priority Data

Mar. 29, 2018 (JP) .................... 2018-065047

(51) Int. Cl.
*B65H 18/26* (2006.01)
*B65H 23/00* (2006.01)
(Continued)

(52) U.S. Cl.
CPC ............... *G06N 3/08* (2013.01); *B65H 18/26* (2013.01); *B65H 23/005* (2013.01);
(Continued)

(58) Field of Classification Search
CPC . G06N 3/08; G06N 3/04; B65H 18/26; B65H 23/005; B65H 23/1955;
(Continued)

(56) References Cited

U.S. PATENT DOCUMENTS 3,809,335 A 5/1974 Mantey
5,308,010 A * 5/1994 Hakiel .................. B65H 18/26
242/534

(Continued)

FOREIGN PATENT DOCUMENTS

CN 103287895 A 9/2013
JP 04-286568 A 10/1992
(Continued)

OTHER PUBLICATIONS

Office Action, issued by the State Intellectual Property Office dated Apr. 1, 2022, in connection with Chinese Patent Application No. 201980018593.5.

(Continued)

*Primary Examiner* — Scott T Baderman
*Assistant Examiner* — Mario M Velez-Lopez
(74) *Attorney, Agent, or Firm* — Edwards Neils LLC; Jean C. Edwards, Esq.

(57) ABSTRACT

A winding condition generating apparatus includes: an input unit; an output unit; and a condition calculation unit. A winding condition calculation unit includes a learning model created by machine learning using a combination of a winding parameter and a winding condition in producing a wound web that satisfies a target winding quality as training data, and calculates a winding condition of a new wound web using the learning model, from a winding parameter of a new wound web input through the input unit. The output unit outputs the winding condition. The winding parameter includes a web width, a web transport velocity, and a web (Continued)

winding length. The winding condition includes a tension of the web at the start of winding and a tension of the web at the end of winding.

15 Claims, 14 Drawing Sheets

(51) Int. Cl.
| | |
|---|---|
| *B65H 23/195* | (2006.01) |
| *B65H 23/198* | (2006.01) |
| *B65H 26/04* | (2006.01) |
| *B65H 26/06* | (2006.01) |
| *B65H 26/08* | (2006.01) |
| *G06N 3/04* | (2023.01) |
| *G06N 3/08* | (2023.01) |

(52) U.S. Cl.
CPC ....... *B65H 23/1955* (2013.01); *B65H 23/198* (2013.01); *B65H 26/04* (2013.01); *B65H 26/06* (2013.01); *B65H 26/08* (2013.01); *G06N 3/04* (2013.01); *B65H 2404/52122* (2013.01); *B65H 2404/5221* (2013.01); *B65H 2511/14* (2013.01); *B65H 2511/166* (2013.01); *B65H 2513/10* (2013.01); *B65H 2515/37* (2013.01); *B65H 2557/38* (2013.01); *B65H 2557/63* (2013.01)

(58) Field of Classification Search
CPC ...... B65H 23/198; B65H 26/04; B65H 26/06; B65H 26/08; B65H 2404/52122; B65H 2404/5221; B65H 2511/14; B65H 2511/166; B65H 2513/10; B65H 2515/37; B65H 2557/03; B65H 2557/63
See application file for complete search history.

(56) References Cited

U.S. PATENT DOCUMENTS

| | | | | |
|---|---|---|---|---|
| 5,971,315 A * | 10/1999 | Kojo | ............... | B65H 18/08 |
| | | | | 242/912 |
| 6,036,137 A * | 3/2000 | Myren | ............... | B65H 18/26 |
| | | | | 242/534 |
| 6,055,522 A * | 4/2000 | Krishna | ............. | G06F 16/972 |
| | | | | 715/205 |
| 6,363,297 B1 * | 3/2002 | Wienholt | ............. | B65H 18/26 |
| | | | | 242/534 |
| 6,584,366 B1 * | 6/2003 | Liepold | ............. | G05B 17/02 |
| | | | | 700/47 |
| 7,344,105 B2 * | 3/2008 | Lindsey | ............. | B65H 18/26 |
| | | | | 242/534 |
| 7,481,390 B2 * | 1/2009 | Reinhold | ........... | B65H 19/2261 |
| | | | | 242/542.3 |
| 9,352,499 B2 * | 5/2016 | Ziegler | ............... | C08L 61/28 |
| 10,019,674 B2 | 7/2018 | Sugimoto | | |
| 10,526,155 B2 * | 1/2020 | Paanasalo | ............. | B65H 18/10 |
| 2008/0197228 A1 | 8/2008 | Mueller et al. | | |
| 2009/0101747 A1 * | 4/2009 | Doeres | ................. | B65H 19/10 |
| | | | | 242/534.2 |
| 2016/0318117 A1 | 11/2016 | Amagata | | |

FOREIGN PATENT DOCUMENTS

| | | | |
|---|---|---|---|
| JP | 06-92524 | A | 4/1994 |
| JP | 07-168799 | A | 7/1995 |
| JP | 5776077 | B2 | 9/2015 |
| JP | 2016-037395 | A | 3/2016 |
| JP | 2016-203246 | A | 12/2016 |
| JP | 2017-069404 | A | 4/2017 |
| JP | 2017-100850 | A | 6/2017 |
| JP | 2017-151962 | A | 8/2017 |
| JP | 2018-026098 | A | 2/2018 |
| TW | 200920497 | A | 5/2009 |
| WO | WO-2005078408 | A1 * | 8/2005 ............... G01N 3/08 |

OTHER PUBLICATIONS

Office Action, issued by the State Intellectual Property Office dated Nov. 5, 2021, in connection with Chinese Patent Application No. 201980018593.5.
Office Action, issued by the Taiwanese Intellectual Property Office dated Sep. 29, 2022, in connection with Taiwanese Patent Application No. 108110430.
Office Action, issued by the Japanese Patent Office dated Apr. 4, 2023, in connection with Japanese Patent Application No. 2022-094278.
International Search Report issued in PCT/JP2019/012408 dated Jun. 11, 2019.
Written Opinion issued in PCT/JP2019/012408 dated Jun. 11, 2019.
International Preliminary Report on Patentability completed by WIPO dated Sep. 29, 2020 in connection with International Patent Application No. PCT/JP2019/012408.
Hiromu Hashimoto, Basic Theory and Application of Web Handling, ISBN 10-4906451365, Apr. 10, 2008, 61, Converting Technical Institute.
Office Action, issued by the Japanese Patent Office dated Nov. 18, 2021, in connection with Japanese Patent Application No. 2020-510048.
Office Action, issued by the Japanese Patent Office dated Mar. 10, 2022, in connection with Japanese Patent Application No. 2020-510048.
Office Action, issued by the Japanese Patent Office dated Sep. 8, 2023, in connection with Japanese Patent Application No. 2022-094278.

* cited by examiner

FIG. 3

TRAINING DATA $TD_n$

| | | ITEM NAME | UNIT |
|---|---|---|---|
| INPUT | WINDING PARAMETER $P_n$ | LINE NAME | ~ |
| | | DIAMETER OF WINDING CORE THAT WINDS WEB | mm |
| | | WEB WIDTH | mm |
| | | WEB TRANSPORT VELOCITY | m/min |
| | | WEB WINDING LENGTH | m |
| | | WEB THICKNESS | $\mu m$ |
| | | DIFFERENCE BETWEEN MAXIMUM THICKNESS AND MINIMUM THICKNESS IN THICKNESS DISTRIBUTION IN WEB WIDTH DIRECTION | $\mu m$ |
| | | MODULUS OF ELASTICITY OF WEB | GPa |
| OUTPUT | WINDING CONDITION $C_n$ | TENSION OF WEB AT START OF WINDING | N |
| | | TENSION OF WEB AT END OF WINDING | N |
| | | KNURLING HEIGHT | $\mu m$ |
| | | DIAMETER OF WEB AT END OF WINDING | mm |
| | | PRESSING FORCE OF TOUCH ROLLER THAT PRESSES WEB | N |
| | | PRESSURE OF AIR PRESS THAT PRESSES WEB | kPa |

FIG. 4

TRAINING DATA $TD_n$

| | | ITEM NAME | UNIT |
|---|---|---|---|
| INPUT | WINDING PARAMETER $P_n$ | LINE NAME | - |
| | | DIAMETER OF WINDING CORE THAT WINDS WEB | mm |
| | | WEB WIDTH | mm |
| | | WEB TRANSPORT VELOCITY | m/min |
| | | WEB WINDING LENGTH | m |
| | | WEB THICKNESS | $\mu$m |
| | | DIFFERENCE BETWEEN MAXIMUM THICKNESS AND MINIMUM THICKNESS IN THICKNESS DISTRIBUTION IN WEB WIDTH DIRECTION | $\mu$m |
| | | MODULUS OF ELASTICITY OF WEB | GPa |
| OUTPUT | WINDING CONDITION $C_n$ | TENSION FUNCTION EXPRESSED WITH RESPECT TO RADIAL COORDINATE | N |
| | | KNURLING HEIGHT | $\mu$m |
| | | PRESSING FORCE FUNCTION OF TOUCH ROLLER | N |
| | | AIR PRESS PRESSURE FUNCTION | kPa |

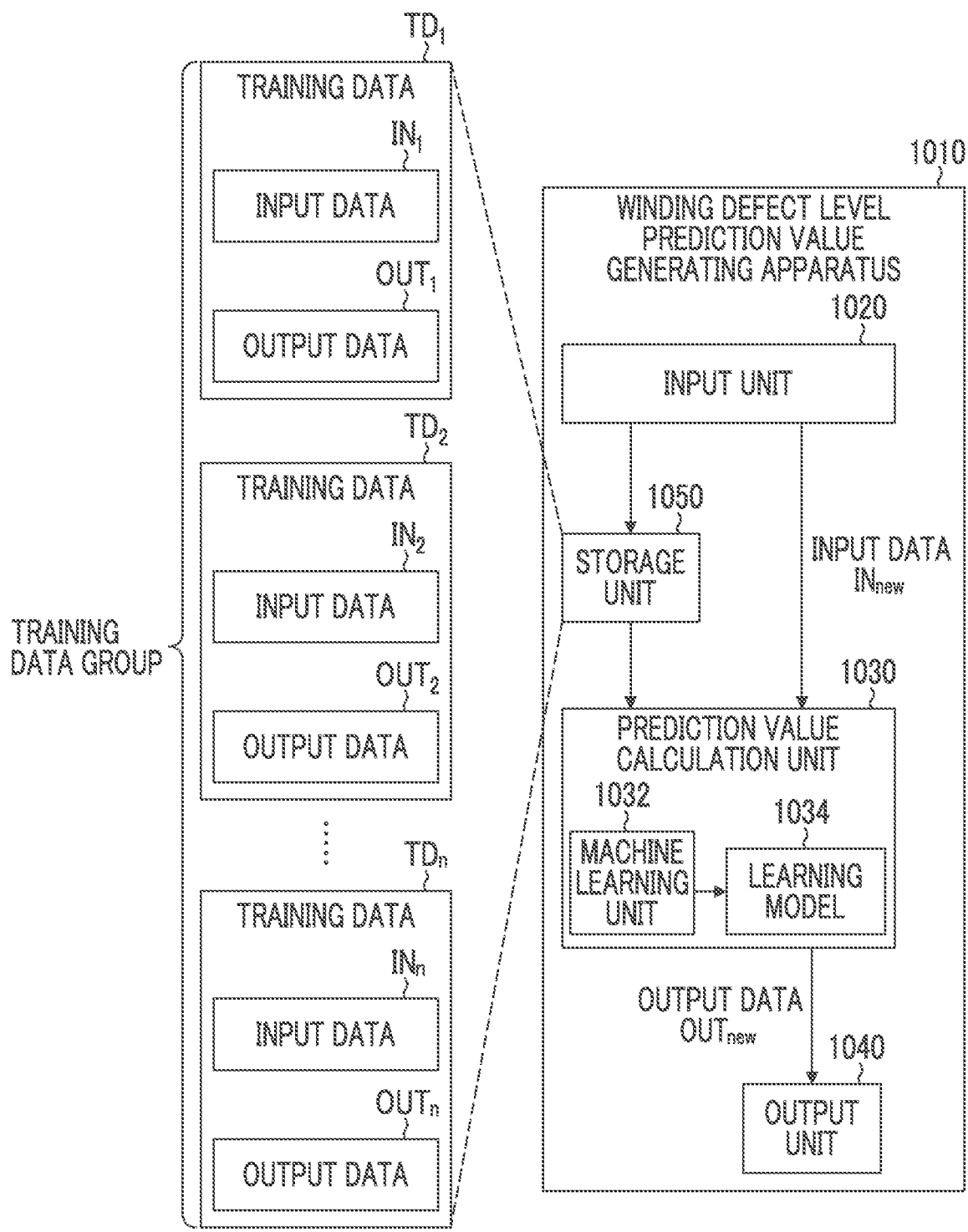

FIG. 10

TRAINING DATA $TD_n$

| | | ITEM NAME | UNIT |
|---|---|---|---|
| INPUT | WINDING PARAMETER $P_n$ | LINE NAME | – |
| | | DIAMETER OF WINDING CORE THAT WINDS WEB | mm |
| | | WEB WIDTH | mm |
| | | WEB TRANSPORT VELOCITY | m/min |
| | | WEB WINDING LENGTH | m |
| | | WEB THICKNESS | $\mu$m |
| | | DIFFERENCE BETWEEN MAXIMUM THICKNESS AND MINIMUM THICKNESS IN THICKNESS DISTRIBUTION IN WEB WIDTH DIRECTION | $\mu$m |
| | | MODULUS OF ELASTICITY OF WEB | GPa |
| | WINDING CONDITION $C_n$ | TENSION OF WEB AT START OF WINDING | N |
| | | TENSION OF WEB AT END OF WINDING | N |
| | | KNURLING HEIGHT | $\mu$m |
| | | DIAMETER OF WEB AT END OF WINDING | mm |
| | | PRESSING FORCE OF TOUCH ROLLER THAT PRESSES WEB | N |
| | | PRESSURE OF AIR PRESS THAT PRESSES WEB | kPa |
| OUTPUT | DEFECT LEVEL $DL_n$ | WEB WINDING MISALIGNMENT VALUE | mm |
| | | WEB DAMAGE DEFECT LEVEL | – |

FIG. 11

TRAINING DATA TD$_n$

| | | ITEM NAME | UNIT |
|---|---|---|---|
| INPUT DATA | WINDING PARAMETER P$_n$ | LINE NAME | - |
| | | DIAMETER OF WINDING CORE THAT WINDS WEB | mm |
| | | WEB WIDTH | mm |
| | | WEB TRANSPORT VELOCITY | m/min |
| | | WEB WINDING LENGTH | m |
| | | WEB THICKNESS | $\mu$m |
| | | DIFFERENCE BETWEEN MAXIMUM THICKNESS AND MINIMUM THICKNESS IN THICKNESS DISTRIBUTION IN WEB WIDTH DIRECTION | $\mu$m |
| | | MODULUS OF ELASTICITY OF WEB | GPa |
| | WINDING CONDITION C$_n$ | TENSION FUNCTION EXPRESSED WITH RESPECT TO RADIAL COORDINATE | N |
| | | KNURLING HEIGHT | $\mu$m |
| | | PRESSING FORCE FUNCTION OF TOUCH ROLLER | N |
| | | AIR PRESS PRESSURE FUNCTION | kPa |
| OUTPUT DATA | DEFECT LEVEL DL$_n$ | WEB WINDING MISALIGNMENT VALUE | mm |
| | | WEB DAMAGE DEFECT LEVEL | - |

WINDING CONDITION GENERATING APPARATUS, WINDING APPARATUS, WINDING DEFECT LEVEL PREDICTION VALUE GENERATING APPARATUS, WINDING CONDITION CALCULATING METHOD, WINDING METHOD, AND WINDING DEFECT LEVEL PREDICTION VALUE GENERATING METHOD

CROSS-REFERENCE TO RELATED APPLICATIONS

The present application is a Continuation of PCT International Application No. PCT/JP2019/012408 filed on Mar. 25, 2019, which was published under PCT Article 21 (2) in Japanese, and which claims priority under 35 U.S.C § 119(a) to Japanese Patent Application No. 2018-065047 filed on Mar. 29, 2018. The above application are hereby expressly incorporated by reference, in their entirety, into the present application.

BACKGROUND OF THE INVENTION

1. Field of the Invention

The present invention relates to a winding condition generating apparatus, a winding apparatus, a winding defect level prediction value generating apparatus, a winding condition calculating method, a winding method, and a winding defect level prediction value generating method.

2. Description of the Related Art

In a case where a product is manufactured using a web such as a thin metal plate, paper, or a plastic film, the web is wound by a winding apparatus after being subjected to treatments such as coating and drying. The wound web produced by the winding apparatus is stored and transported in the form of a roll.

In the above-mentioned winding, it is necessary that winding misalignment of the web and damage of the web do not occur in the wound web. The winding misalignment of the web refers to a phenomenon in which a web wound on a roll is misaligned in a width direction of the web. The damage of the web refers to a phenomenon in which deformation such as wrinkles, dents, and patterns occurs in a web wound on a roll.

Against the winding misalignment of the web, tightly winding the web, such as increasing tension in a case where the web is wound, is effective for suppressing the winding misalignment of the web. However, the tight winding of the web also causes damage of the web.

On the other hand, against the damage of the web, loosely winding the web, such as lowering tension in a case where the web is wound, is effective for suppressing the damage of the web. However, the loose winding of the web also causes the winding misalignment of the web.

As described above, the winding misalignment of the web and the damage of the web are in a trade-off relationship, and thus, it is not easy to set a winding condition capable of suppressing the winding misalignment of the web and the damage of the web. Various proposals have been made to deal with such a problem (JP2017-100850A and JP5776077B).

SUMMARY OF THE INVENTION

In JP2017-100850A and JP5776077B, a theoretical model is used to obtain a winding tension. However, in a case where the theoretical model is used, the winding tension is limited to a range in which the theoretical model is considered. Further, the theoretical model is not always suitable for actual web winding. In a case where the theoretical model is not suitable, it is difficult to set a highly accurate winding condition.

Thus, in order to set a winding condition of a web, in reality, it is necessary to actually perform the setting using a winding apparatus, which is economically and temporally consuming.

The present invention has been made in view of such circumstances, and an object of the present invention is to provide a winding condition generating apparatus, a winding apparatus, a winding defect level prediction value generating apparatus, a winding condition calculating method, a winding method, and a winding defect level prediction value generating method capable of setting winding conditions suitable for an actual result regardless of suitability of a theoretical model.

According to a first aspect, there is provided a winding condition generating apparatus comprising: an input unit; an output unit; and a condition calculation unit, in which the condition calculation unit comprises a learning model created by machine learning using a combination of a winding parameter and a winding condition in producing a wound web that satisfies a target winding quality as training data, and calculates a winding condition of a new wound web using the learning model, from a winding parameter of a new wound web input through the input unit, and in which the output unit outputs the winding condition, in which the winding parameter includes a web width, a web transport velocity, and a web winding length, and in which the winding condition includes a tension of the web at the start of winding and a tension of the web at the end of winding.

According to a second aspect, in the winding condition generating apparatus, the winding parameter includes at least one of a diameter of a winding core around which the web is wound, a name of a line in which the wound web is produced, a thickness of the web, a difference between a maximum thickness and a minimum thickness in a web width direction, or a modulus of elasticity of the web, and the winding condition includes at least one of a diameter of the web at the end of winding, a knurling height, a pressure of an air press that presses the web, or a pressing force of a touch roller that presses the web.

According to a third aspect, in the winding condition generating apparatus, the target winding quality is non-occurrence of a web winding misalignment defect and a web damage defect.

According to a fourth aspect, in the winding condition generating apparatus, the machine learning includes a neural network and deep learning.

According to a fifth aspect, in the winding condition generating apparatus, in a case where with respect to a set of the winding conditions obtained in producing the web, which is the training data, a value of each winding condition item is denoted by $C_{ni}$, an allowable quality range value set to the value $C_{ni}$ of the winding condition item is denoted by $T_{ni}$, and the number of items to which the allowable quality range value $T_{ni}$ is set is denoted by N, a range obtained by the following Equation for each item is added to the winding conditions, and $3^N - 1$ pieces of the training data or a part of the training data is assigned as additional training data.

$$C_k = C_{ni} \pm 0.5 \times T_{ni}$$

According to a sixth aspect, in the winding condition generating apparatus, the winding condition includes any one of a tension function expressed with respect to a radial coordinate of a winding roll, an air press pressure function for pressing the web, and a function of a pressing force of a touch roller.

According to a seventh aspect, the winding condition generating apparatus further comprises a machine learning unit that performs machine learning using the combination of the winding parameter and the winding condition in producing the wound web that satisfies the target winding quality, as the training data.

According to an eighth aspect, there is provided a winding apparatus that winds a web using the winding condition calculated by the winding condition generating apparatus.

According to a ninth aspect, there is provided a winding defect level prediction value generating apparatus comprising an input unit; an output unit; and a prediction value calculation unit, in which the prediction value calculation unit includes a learning model that is created by machine learning using a combination of a winding parameter, a winding condition and a winding defect level value in producing a wound web, as training data, and calculates a winding defect level prediction value from a winding parameter and a winding condition of a new wound web input through the input unit, using the learning model, and in which the output unit outputs the winding defect level prediction value, in which the winding parameter includes at least one of a web width, a web transport velocity, a web winding length, a diameter of a winding core around which the web is wound, a name of a line in which the wound web is produced, a web thickness, a difference between a maximum thickness and a minimum thickness in a web width direction, or a modulus of elasticity of the web, in which the winding condition includes at least one of a tension of the web at the start of winding, a tension of the web at the end of winding, a knurling height, a pressure of an air press for pressing the web, or a pressing force of a touch roller for pressing the web, and in which the winding defect level prediction value includes a web winding misalignment value and a web damage defect level.

According to a tenth aspect, there is provided a winding condition generating apparatus comprising: a defect level calculation model that is a learning model in the above-described winding defect level prediction value generating apparatus, receives an input of a winding condition, and outputs a web winding misalignment value and a web damage defect level; and a winding condition calculation unit, in which the winding condition calculation unit changes, using each sum of the web winding misalignment values and the web damage defect levels that are the output of the defect level calculation model as an objective function, and using the winding condition as a design variable, the design variable through evolutionary computation until the objective function becomes minimum, and outputs a winding condition that is a design variable in a case where the objective function becomes minimum, as the winding condition.

According to an eleventh aspect, there is provided a winding condition calculating method at least comprising: a step of creating a learning model by performing machine learning using a combination of a winding parameter and a winding condition in producing a wound web that satisfies a target winding quality as training data; a step of inputting a winding parameter of a new wound web; and a step of calculating a winding condition of the new wound web using the learning model from the winding parameter, in which the winding parameter includes a web width, a web transport velocity, and a web winding length, and in which the winding condition includes a tension of the web at the start of winding and a tension of the web at the end of winding.

According to a twelfth aspect, in the winding condition calculating method, the winding parameter includes at least one of a diameter of a winding core around which the web is wound, a name of a line in which the wound web is produced, a thickness of the web, a difference between a maximum thickness and a minimum thickness in a web width direction, or a modulus of elasticity of the web, and the winding condition includes at least one of a diameter of the web at the end of winding, a knurling height, a pressure of an air press that presses the web, or a pressing force of a touch roller that presses the web.

According to a thirteenth aspect, the winding condition calculating method further comprises: a step of adding, in a case where with respect to a set of the winding conditions obtained in producing the web, which is the training data, a value of each winding condition item is denoted by $C_{ni}$, an allowable quality range value set to the value $C_{ni}$ of the winding condition item is denoted by $T_{ni}$ and the number of items to which the allowable quality range value $T_{ni}$ is set is denoted by N, a range obtained by the following Equation for each item, to the winding conditions, and assigning $3^N-1$ pieces of the training data or a part of the training data, as additional training data.

$$C_k = C_{ni} \pm 0.5 \times T_{ni}$$

According to a fourteenth aspect, in the winding condition calculating method, the winding condition includes any one of a tension function expressed with respect to a radial coordinate of a winding roll, an air press pressure function for pressing the web, or a function of a pressing force of a touch roller.

According to a fifteenth aspect, there is provided a winding method comprising: a step of calculating a winding condition using the above-described winding condition calculating method; and a step of winding a web using the calculated winding condition.

According to a sixteenth aspect, there is provided a winding defect level prediction value generating method at least comprising: a step of creating a learning model that machine-learns training data of a combination having a winding parameter and a winding condition in producing a winding roll as an input and having a winding defect level value as an output; a step of inputting a winding parameter and a winding condition of a new wound web; a step of calculating a winding defect level prediction value of the new wound web from the winding parameter and the winding condition, using the learning model, in which the winding parameter includes at least one of a web width, a web transport velocity, a web winding length, a diameter of a winding core around which the web is wound, a name of a line in which the wound web is produced, a web thickness, a difference between a maximum thickness and a minimum thickness in a web width direction, or a modulus of elasticity of the web, in which the winding condition includes at least one of a tension of the web at the start of winding, a tension of the web at the end of winding, a knurling height, a pressure of an air press for pressing the web, or a pressing force of a touch roller for pressing the web, and in which the winding defect level prediction value includes a web winding misalignment value and a web damage defect level.

According to a seventeenth aspect, there is provided a winding condition generating method comprising: a step of creating a defect level calculation model, which is a learning model in the winding defect level prediction value generating apparatus, and which receives an input of a winding condition, and outputs a web winding misalignment value, and a web damage defect level; and a step of calculating the winding condition, in which in the step of calculating the winding condition, using each sum of the web winding misalignment values and the web damage defect levels that are the output of the defect level calculation model as an objective function, and using the winding condition as a design variable, the design variable is changed through evolutionary computation until the objective function becomes minimum, and a winding condition that is a design variable in a case where the objective function becomes minimum is output as the winding condition.

According to the present invention, it is possible to set a winding condition suitable for an actual result regardless of suitability of a theoretical model.

BRIEF DESCRIPTION OF THE DRAWINGS

FIG. 3 is a table illustrating an example of winding parameters and winding conditions included in training data.

FIG. 4 is a table illustrating another example of winding parameters and winding conditions included in training data.

FIG. 9 is a schematic block diagram of a winding defect level prediction value generating apparatus.

FIG. 10 is a table illustrating an example of input data and output data included in training data.

FIG. 11 is a table illustrating another example of input data and output data included in training data.

DESCRIPTION OF THE PREFERRED EMBODIMENTS

Hereinafter, preferred embodiments of the present invention will be described with reference to the accompanying drawings. The present invention is illustrated by the following preferred embodiments. Modifications may be made in many ways and other embodiments other than the embodiments may be utilized, without departing from the scope of the invention. Accordingly, all modifications within the scope of the present invention are included in the claims.

<Winding Condition Generating Apparatus>

Figure 1:
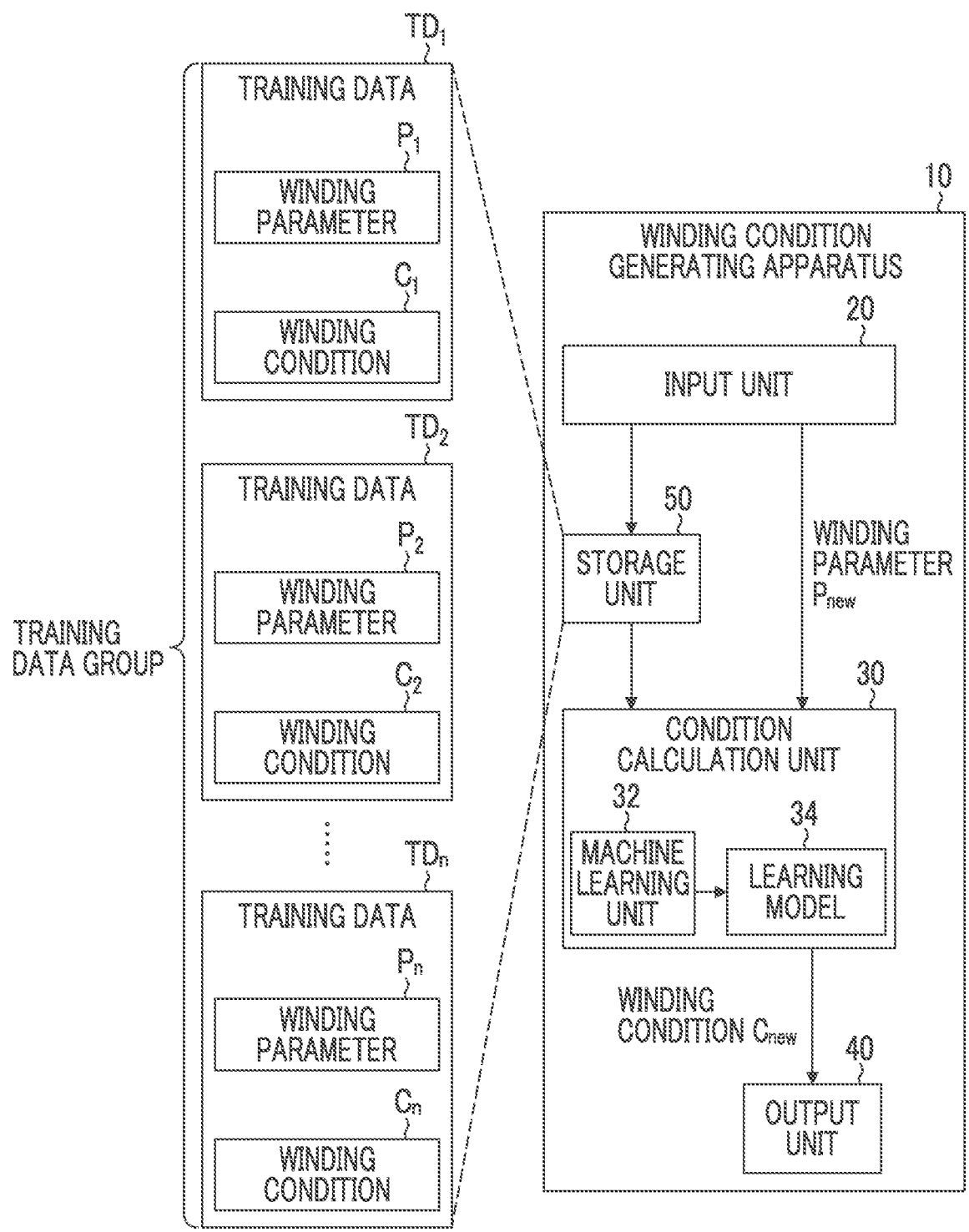
FIG. 1 is a schematic block diagram of a winding condition generating apparatus.

FIG. 1 is a schematic block diagram of a winding condition generating apparatus. As shown in FIG. 1, a winding condition generating apparatus 10 comprises an input unit 20, a condition calculation unit 30, an output unit 40, and a storage unit 50.

The input unit 20 receives data from the outside to the winding condition generating apparatus 10. The input unit 20 may be configured by, for example, a keyboard, a touch pad, a communication interface for electric signals, and a combination thereof. The configuration of the input unit 20 is not particularly limited. In a case where the input unit 20 is a communication interface, data stored in another electronic device may be directly received through the input unit 20. The communication interface may be wired or wireless.

The storage unit 50 stores the data input through the input unit 20. In the embodiment, a plurality of pieces of training data $TD_1$, training data $TD_2$, . . . , training data $TD_n$ are stored in the storage unit 50. As the storage unit 50, for example, a device including a magnetic disk such as a hard disk drive (HDD), a device including a flash memory such as an embedded multimedia card (eMMC), or a solid state drive (SSD), or the like, may be used. Note that n is an integer.

The training data $TD_n$ is information related to a wound web for which it is confirmed whether a target winding quality is satisfied. The target winding quality means that no web winding misalignment defect occurs and no web damage defect occurs. The fact that no defect occurs includes both that the defect does not occur at all and that the defect is within an allowable range. As the training data $TD_n$, good quality data regarding production of a wound web is extracted.

The training data $TD_1$ includes a winding parameter $P_1$ and a winding condition $C_1$, and the training data $TD_2$ includes a winding parameter $P_2$ and a winding condition $C_2$. Each training data $TD_n$ includes a winding parameter $P_n$ and a winding condition $C_n$. The winding parameter $P_n$ and the winding condition $C_n$ included in the training data $TD_n$ are information for producing a wound web, and the winding parameter $P_n$ and the winding condition $C_n$ are acquired as combination information. The winding parameter $P_n$ is a condition that is a prerequisite in producing a wound web, and the winding condition $C_n$ is an operating condition in actually producing the wound web. Details of the winding parameter $P_n$ and the winding condition $C_n$ will be described later.

The condition calculation unit 30 comprises a machine learning unit 32 and a learning model 34. The machine learning unit 32 is configured to perform machine learning using a block of the plurality of pieces of training data $TD_1$, training data $TD_2$, . . . , training data $TD_n$ as a training data group. In the machine learning unit 32, the winding parameter $P_n$ forms input training data. The winding condition $C_n$ becomes output training data.

The machine learning unit 32 learns a correlation between the winding parameter $P_n$ and the winding condition $C_n$, which will be described later, from the training data $TD_n$ that is a combination of the winding parameter $P_n$ and the winding condition $C_n$.

The condition calculation unit 30 comprises a learning result learned by the machine learning unit 32 as a learning model 34. The learning model 34 calculates a winding condition $C_{new}$ of a new wound web as a prediction value, from a winding parameter $P_{new}$ of a new wound web input through the input unit 20. The winding parameter $P_{new}$ of the new wound web is also referred to as a new winding parameter $P_{new}$, and is shown as the winding parameter $P_{new}$ in the figure. The winding condition $C_{new}$ of the new wound web is also referred to as a new winding condition $C_{new}$, and is shown as the winding condition $C_{new}$ in the figure. In this embodiment, the condition calculation unit 30 comprises the machine learning unit 32, but the condition calculation unit 30 may comprise at least the learning model 34.

The output unit 40 outputs the new winding condition $C_{new}$ calculated by the learning model 34. The output unit 40 may be configured by, for example, a display, a printer, a communication interface for electric signals, and a combination thereof. In a case where the output unit 40 is a communication interface, the new winding condition $C_{new}$ may be directly transmitted to, for example, a control device (not shown) provided in the winding apparatus. Similar to the input unit 20, the communication interface may be wired or wireless.

Figure 2:
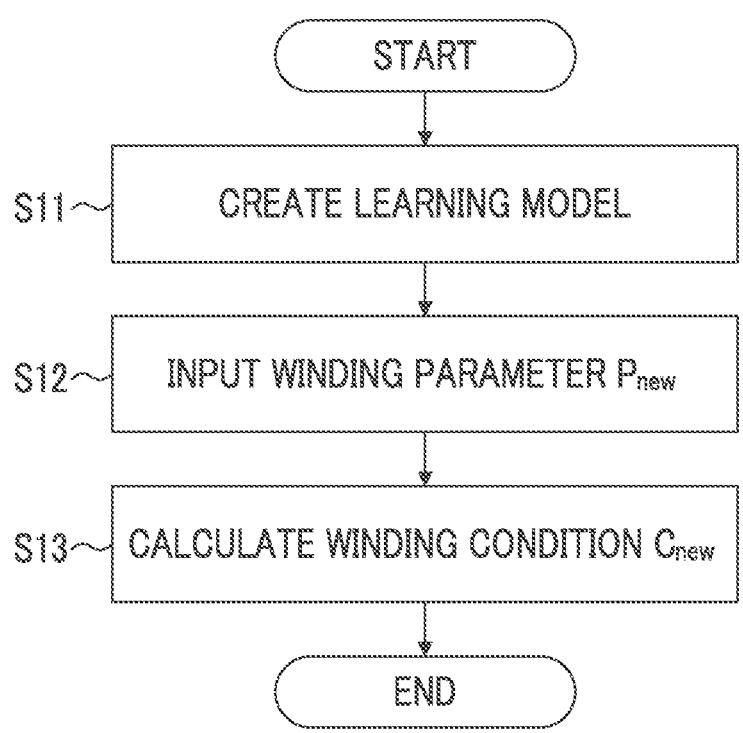
FIG. 2 is a flowchart illustrating a winding condition calculating method.

A winding condition calculating method using the winding condition generating apparatus 10 will be described. As shown in FIG. 2, the learning model 34 is produced by machine learning of the machine learning unit 32, for example, using a combination of the winding parameter $P_n$ and the winding condition $C_n$ as the training data $TD_n$ (step S11). It is preferable to perform learning using a plurality of pieces of training data $TD_n$.

Then, a new winding parameter $P_{new}$ is input (step S12). The new winding parameter $P_{new}$ is input to the learning model 34.

Then, the learning model 34 calculates a new winding condition $C_{new}$ as a prediction value from the input new winding parameter $P_{new}$ (step S13).

Since the machine learning unit 32 creates the learning model 34 on the basis of the training data $TD_n$ that satisfies the target winding quality, it is possible to obtain a new winding condition $C_{new}$ with a high expectation value that enables high-quality winding.

<Training Data>

A configuration of the training data $TD_n$ will be described. FIG. 3 is a table showing an example of a combination of winding parameters $P_n$ and winding conditions Cn that can be used for the training data TD. As shown in FIG. 3, the winding parameters $P_n$ includes eight items, for example, a line name (also referred to as a line number), a diameter (mm) of a winding core around which a web is wound, a width (mm) of the web, and a transport velocity (m/min) of the web, a winding length (m) of the web, a thickness (μm) of the web, a difference (μm) between a maximum thickness and a minimum thickness in a thickness distribution in a web width direction, and a modulus of elasticity (GPa) of the web.

The line name refers to a name for identifying a manufacturing line, and a unique number is assigned to each line. The diameter of the winding core around which the web is wound refers to the diameter of the winding core set in the winding apparatus, and is also the diameter of the web at the start of winding. The width of the web refers to the length thereof in a direction orthogonal to a length direction of the web. The transport velocity of the web refers to the speed of the web that moves along a transport direction on the manufacturing line. The winding length of the web refers to the length of the web that is wound around the winding core, which is the length of the wound web (in a rolled state of a finished product). The thickness of the web refers to a distance between two opposing main surfaces of the web. The main surfaces are surfaces having a large area. The thickness of the web may be measured with a thickness gauge. The difference between the maximum thickness and the minimum thickness in the thickness distribution in the width direction of the web refers to a difference between a maximum thickness and a minimum thickness in a case where the thickness is measured at a predetermined interval in a width direction of the web in which a certain distance from both edges of the web is excluded. The measurement may be performed with a continuous thickness meter (manufactured by ANRITSU). The modulus of elasticity of the web refers to a value measured by TENSILON (tensile testing machine).

The winding condition $C_n$ includes six items, that is, a tension (N) of a web at the start of winding, a tension (N) of the web at the end of winding, a knurling height (μm), a diameter of the end of the winding of the web (mm), a pressing force (N) of a touch roller that presses the web, and a pressure (kPa) of an air press that presses the web.

The tension of the web at the start of winding refers to a tension applied to the web at the start of winding. The tension of the web at the end of winding refers to a tension applied to the web in a case where the web reaches the winding length. The knurling height refers to a difference between the thickness of a knurling region formed at both edge portions of the web and the thickness of a region where knurling is not formed. The knurling refers to an unevenness formed at both edge portions of the web. The diameter of the web at the end of winding refers to the diameter of the web in a case where the web reaches the winding length. The pressing force of the touch roller that presses the web refers to a force at which the touch roller presses the web toward the winding core in winding the web. The pressure of the air press that presses the web refers to a pressure at which air ejected from a nozzle presses the web toward the winding core in winding the web, or an internal pressure inside the air nozzle at that time.

FIG. 4 is a table showing another example of a combination of the winding parameters $P_n$ and the winding conditions $C_n$ that can be used for the training data TD.

Items different from those in the table of FIG. 3 will be described. In the table of FIG. 4, the winding condition $C_n$ includes a tension function (N) expressed with respect to a radial coordinate of a winding roll, a pressing force function (N) of a touch roller, and an air press pressure function (kPa). The tension function expressed with respect to the radial coordinate of the winding roll includes the tension of the web at the start of winding, the tension of the web at the end of winding, and the diameter of the web at the end of winding. Further, the pressing force function of the touch roller includes a pressing force of the touch roller that presses the web. Further, the air press pressure function includes a pressure of the air press that presses the web. In FIG. 4, the "tension function expressed with respect to the radial coordinate of the winding roll" is expressed as a "tension function expressed with respect to a radial coordinate".

Accordingly, the winding condition $C_n$ does not include the tension of the web at the start of winding, the tension of the web at the end of winding, the diameter of the web at the end of winding, the pressing force of the touch roller that presses the web, and the pressure of the air press that presses the web.

The tension function expressed with respect to the radial coordinate of the winding roll refers to a function that defines a relationship between the winding diameter of the web and the tension of the web. The tension function may be represented by, for example, a straight line, a polygonal line, a curve, or the like in a case where plotting is performed on a graph using the tension as a vertical axis and the web diameter as a horizontal axis.

The pressing force function of the touch roller refers to a function that defines a relationship between the winding diameter of the web and the pressing force of the touch roller. The air press pressure function refers to a function that defines a relationship between the web winding diameter and the air press pressure.

In the training data $TD_n$, the winding parameters $P_n$ forms input data, and the winding conditions $C_n$ forms output data. The winding parameters $P_n$ basically include items that cannot be adjusted in a case where the winding of the web is started, such as the line name, the diameter of the winding core around which the web is wound, the width of the web, the thickness of the web, the difference between the maximum thickness and the minimum thickness in the thickness distribution in the web width direction, and the modulus of elasticity of the web. On the other hand, the winding parameters $P_n$ of the embodiment include the web transport velocity and the web winding length that can be adjusted even after the winding of the web is started. The web transport velocity and the web winding length are factors that determine productivity. Since it is premised that a web productivity target is achieved, the web transport velocity and the web winding length are included in the winding parameters $P_n$ which are the input data. It is important to produce a wound web that achieves the web productivity target and satisfies the target winding quality.

The winding conditions $C_n$ basically include items that can be adjusted after the winding of the web is started, such as the tension of the web at the start of winding, the tension of the web at the end of winding, the diameter of the web at the end of winding, the pressing force of the touch roller that presses the web, and the pressure of the air press that presses the web.

On the other hand, the winding conditions $C_n$ of the embodiment include a knurling height that cannot be adjusted after the winding is started. The knurling is provided in order to prevent winding misalignment in producing a wound web or after winding. Since the knurling height relates to the winding quality and can be adjusted before the winding is started, the knurling height is included in the winding conditions $C_n$ which are output data.

The winding parameters $P_n$ and the winding conditions $C_n$ are illustrated in FIGS. 3 and 4, the winding parameters $P_n$ and the winding conditions $C_n$ are not limited thereto. The winding parameters $P_n$ may include at least the width of the web, the transport velocity of the web, and the winding length of the web. The winding conditions $C_n$ may include at least the tension of the web at the start of winding and the tension of the web at the end of winding.

Further, in order to obtain new winding conditions $C_{new}$ with higher accuracy, the following items may be added as the winding conditions $C_n$. For example, in addition to the tensions (N) at the start and the end of winding and the winding diameter (mm), a tension (N) between the start and the end of winding and a corresponding winding diameter (mm) may be added.

A relationship between the pressing force (N) of the touch roller and the winding diameter (mm) may be added. Similarly, a relationship between the pressure (kPa) of the air press and the winding diameter (mm) may be added.

<Condition Calculation Unit>

Figure 5:
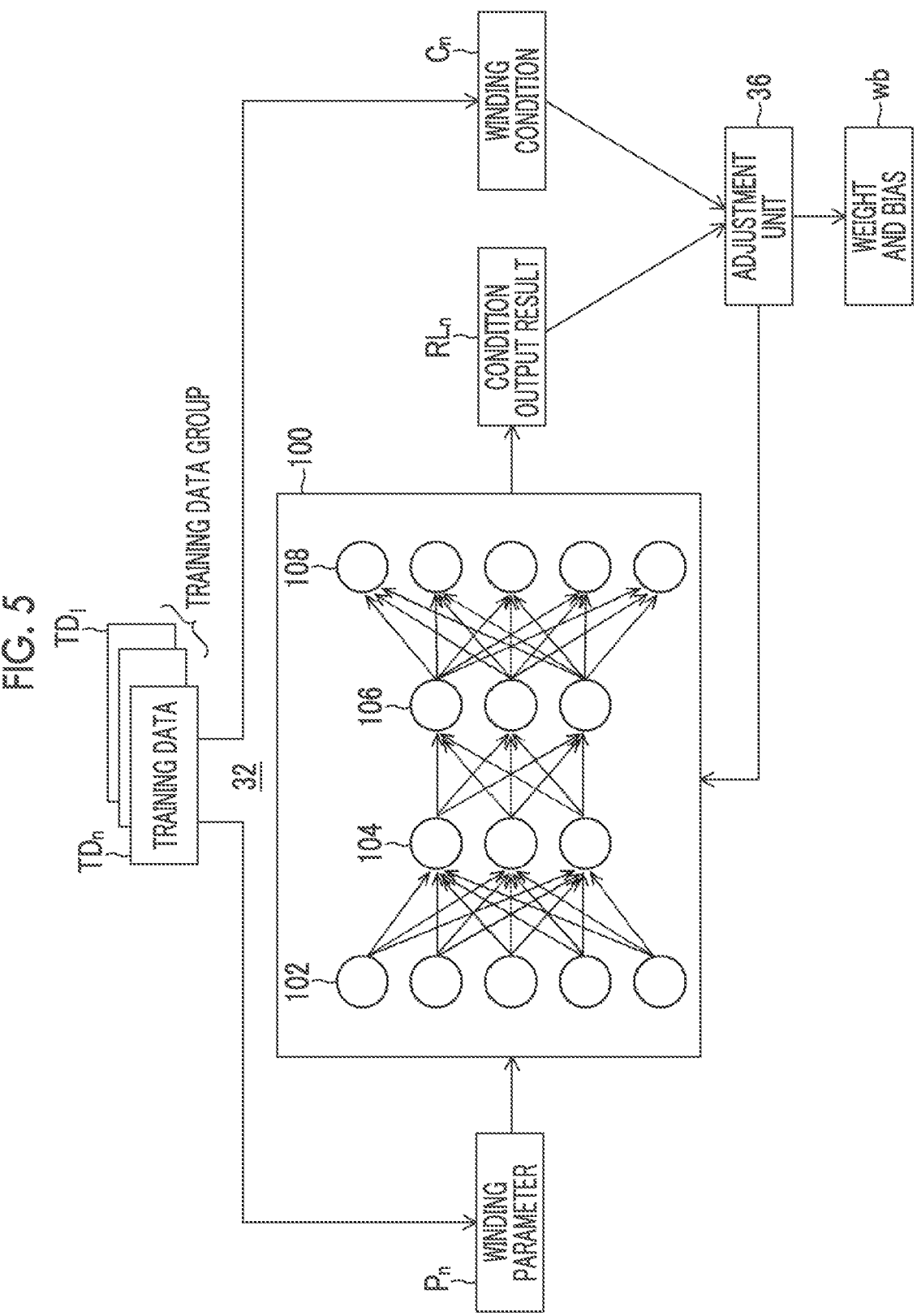
FIG. 5 is a schematic block diagram of a machine learning unit.

The machine learning unit 32 and the learning model 34 included in the condition calculation unit 30 will be described. FIG. 5 is a schematic configuration diagram of the machine learning unit 32. As shown in FIG. 5, the machine learning unit 32 includes a neural network 100 and deep learning. The neural network 100 is configured of a so-called three-layer neural network that comprises an input layer 102, a first interlayer 104, a second interlayer 106, and an output layer 108. The input layer 102 and the output layer 108 comprise five neurons. The first interlayer 104 and the second interlayer 106 each comprise three neurons. The neural network 100 is fully connected. Here, the deep learning means learning having such improved performance as to prevent a problem (gradient disappearance, overlearning, or the like) that the learning is not well executed in a case where layers configured from the input layer 102 to the output layer 108 has a multi-layered structure.

The winding parameters $P_n$ are input to the input layer 102 as input data from the training data $TD_n$. The input data includes at least the width of the web, the transport velocity of the web, and the winding length of the web.

The input data input to the input layer 102 is multiplied by a certain weight, is subjected to addition of a bias, and is then input to the first interlayer 104. The input data input to the first interlayer 104 is multiplied by a certain weight, is subjected to addition of a bias, and is then input to the second interlayer 106. The input data input to the second interlayer 106 is multiplied by a certain weight, is subjected to addition of a bias, and is then input to the output layer 108. In each neuron, the weight to be multiplied and the value of the bias to be added are set arbitrarily. As an activation function for converting an input into an output in a neuron, for example, a rectified linear unit (ReLU) may be used. The activation function is not limited to the ReLU.

Condition output results $RL_n$ corresponding to the winding parameters $P_n$ are output from the output layer 108. The condition output results $RL_n$ include at least the tension of the web at the start of winding and the tension of the web at the end of winding.

The condition output results $RL_n$ are input to the adjustment unit 36. The winding conditions $C_n$ corresponding to the winding parameters $P_n$ are input from the training data $TD_n$ to the adjustment unit 36. The winding conditions $C_n$ include at least the tension of the web at the start of winding and the tension of the web at the end of winding.

The adjustment unit 36 compares the condition output results $RL_n$ with the winding conditions $C_n$. The adjustment unit 36 obtains a value of a square sum error as a loss function, for example. The same operation is performed for all the training data $TD_1$ to $TD_n$ included in a prepared training data group. The adjustment unit 36 adjusts weights and biases so that a sum of the square sum errors of the condition output results $RL_n$ and the winding conditions $C_n$ becomes the minimum. Learning is executed by repeating such adjustment a plurality of times. In a case where the learning is finished, data of the learned weights and biases wb are stored in a storage unit (not shown).

Regarding the neural network 100, the numbers of the input layer 102, the first interlayer 104, the second interlayer 106, and the output layer 108, and the number of neurons are not particularly limited. It is preferable that the number of layers and the number of neurons become larger as the number of input/output data items becomes larger.

In learning using the neural network 100, a dropout technique may be applied as a measure against overlearning. The dropout technique refers to a technique for randomly erasing neurons in the interlayer. The dropout technique can improve a generalization performance of the neural network 100. The measure against overlearning is not limited to the dropout technique, and various regularization techniques may be applied.

Figure 6:
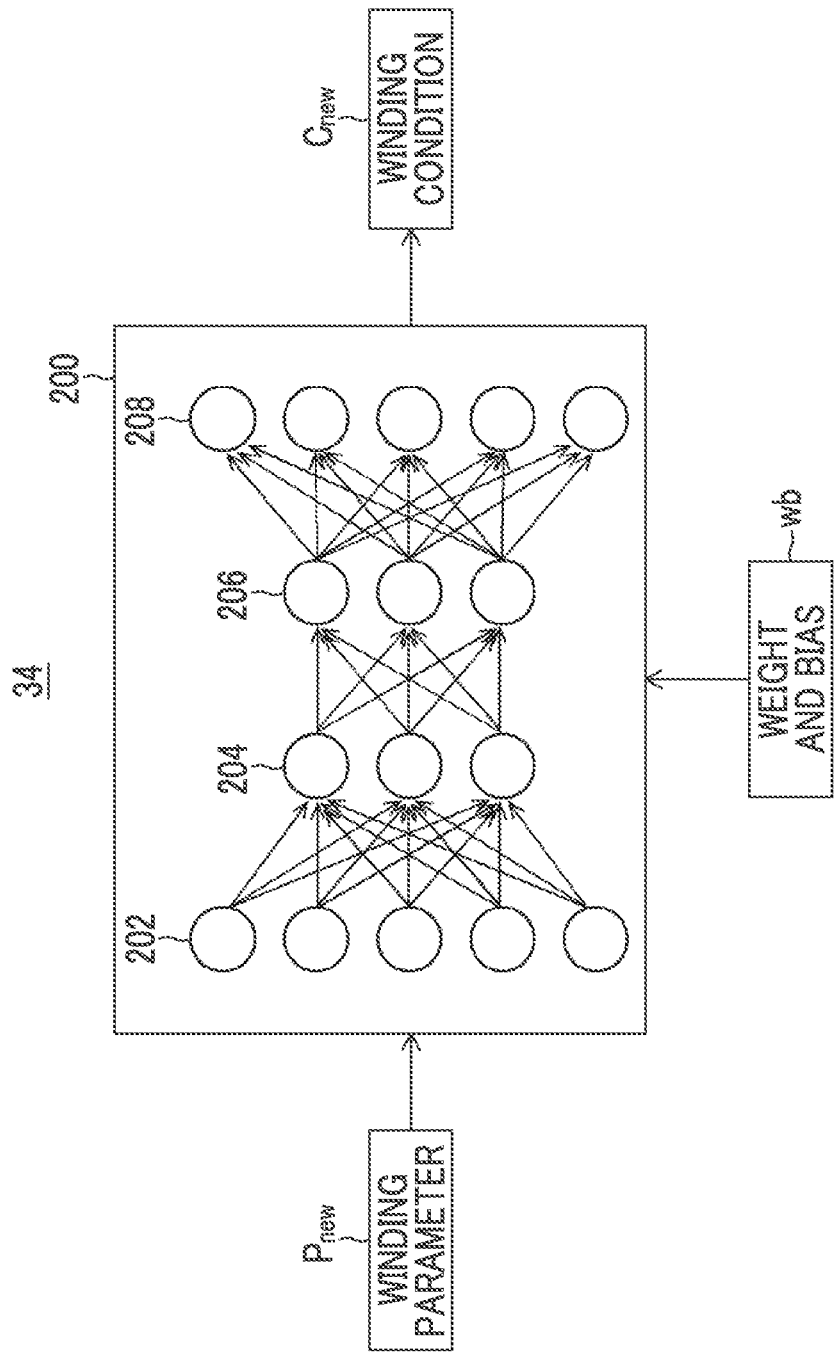
FIG. 6 is a schematic block diagram of a learning model.

FIG. 6 is a schematic configuration diagram of the learning model 34. The learning model 34 is configured such that a neural network 200 has a so-called three-layer neural network comprising an input layer 202, a first interlayer 204, a second interlayer 206, and an output layer 208. The input layer 202 and the output layer 208 comprise five neurons, respectively. The first interlayer 204 and the second interlayer 206 comprise three neurons, respectively. In the neural network 200, the weight and bias wb learned by the machine learning unit 32 shown in FIG. 5 are set for each neuron.

The new winding parameters $P_{new}$ are input to the input layer 202 of the neural network 200. In each neuron, the data of the weight and the bias wb are used so that the weight is multiplied and the bias is added, and the result is input to the output layer 208. The new winding conditions $C_{new}$ corresponding to the new winding parameters $P_{new}$ are calculated as prediction values, and are output from the output layer 208.

In the embodiment, a case where the machine learning unit 32 and the learning model 34 use different neural networks has been described. The machine learning unit 32 and the learning model 34 may use a common neural network. The weight and the bias are learned by the neural network of the machine learning unit 32. Then, the learned weight and bias are set in the neural network of the machine learning unit 32. A configuration in which the machine learning unit 32 functions as the learning model 34 may be used.

The machine learning unit 32 and the learning model 34 may be physically separated. The machine learning unit 32 and the learning model 34 are not particularly limited as long as the learning result of the machine learning unit 32 is used by the learning model 34. Further, the learning model 34 may be a model created by a device such as a separate server. That is, the learning model 34 that has been learned by a separate server or the like may be input to the condition calculation unit 30 of the winding condition generating apparatus 10.

In a case where the machine learning unit 32 performs learning, learning using a large amount of high-quality training data $TD_n$ leads to improvement in accuracy of a prediction value. On the other hand, in a case where the winding conditions $C_n$ having a limited winding quality range is extracted and the machine learning unit 32 performs learning using the training data $TD_n$ including the winding conditions $C_n$, each item of new winding conditions $C_{new}$ output from the learning model 34 also has a limited value. This is because the learning result depends on the training data TD. Thus, it is difficult to recognize how much each item of the winding conditions $C_{new}$ has an allowable width.

In the embodiment, it is possible to effectively increase reliable training data $TD_n$, and to confirm an allowable width of each item of the winding conditions $C_{new}$ by the following method.

First, each item (for example, a tension of the web at the start of winding, a knurling height, or the like) is extracted from the set of the winding conditions $C_n$ included in the training data $TD_n$. A manufacturing control width for each item is confirmed. There is a case where each item has a manufacturing control width. The manufacturing control width refers to an allowable quality range value that is allowable at the time of winding. For example, the above-mentioned tension has a manufacturing control width of 10N. That is, in a case where the web is wound, ±5N is an allowable range for a certain tension. Similarly, the knurling height has a manufacturing control width of, for example, 1 μm depending on the product type, and in this case, ±0.5 μm is an allowable range.

Accordingly, regarding each item included in the winding conditions $C_n$, a case where 0.5 times the manufacturing control width shown in the following Equation 1 is added and a case where 0.5 times the manufacturing control width is subtracted are included as items.

$$C_k = C_{ni} \pm 0.5 \times T_{ni} \quad (1)$$

Here, $C_{ni}$ represents an item included in the winding condition $C_n$, and T represents a manufacturing control width. That is, $C_k$ includes $C_{ni}+0.5\times T_{ni}$ and $C_{ni}-0.5\times T_{ni}$. Including these, additional winding conditions $C_{ad}$ for the winding conditions $C_n$ are allowed. That is, in addition to the training data $TD_n$ that is a combination of the winding parameters $P_n$ and the winding conditions $C_n$, a combination of the winding parameters $P_n$ and the additional winding conditions $C_{ad}$ is added to the training data $TD_n$ as additional training data $TD_{ad}$.

Next, how much the additional winding conditions $C_{ad}$ increase with respect to the winding conditions $C_n$ will be described. In a case where the above-mentioned $C_k = C_{ni} \pm 0.5 \times T_{ni}$ is recognized, as a result, focusing on one item, three values of $C_{ni}$, $C_{ni}+0.5\times T_{ni}$, and $C_{ni}-0.5\times T_{ni}$ are included.

For example, a case will be described in which the winding conditions $C_n$ has four items, values of the items are $C_{n1}$ to $C_{n4}$, and the items have manufacturing control widths of $T_{n1}$ to $T_{n4}$, respectively.

The following shows combinations of values of respective items of the winding conditions $C_n$.

No1: $(C_{n1}+0.5\times T_{n1}, C_{n2}+0.5\times T_{n2}, C_{n3}+0.5\times T_{n3}, C_{n4}+0.5\times T_{n4})$
No2: $(C_{n1}, C_{n2}+0.5\times T_{n2}, C_{n3}+0.5\times T_{n3}, C_{n4}+0.5\times T_{n4})$
No3: $(C_{n1}-0.5\times T_{n1}, C_{n2}+0.5\times T_{n2}, C_{n3}+0.5\times T_{n3}, C_{n4}+0.5\times T_{n4})$
No4: $(C_{n1}+0.5\times T_{n1}, C_{n2}, C_{n3}+0.5\times T_{n3}, C_{n4}+0.5\times T_{n4})$
No5: $(C_{n1}, C_{n2}, C_{n3}+0.5\times T_{n3}, C_{n4}+0.5\times T_{n4})$
No6: $(C_{n1}-0.5\times T_{n1}, C_{n2}, C_{n3}+0.5\times T_{n3}, C_{n4}+0.5\times T_{n4})$
No7: $(C_{n1}+0.5\times T_{n1}, C_{n2}-0.5\times T_{n2}, C_{n3}+0.5\times T_{n3}, C_{n4}+0.5\times T_{n4})$
No8: $(C_{n1}, C_{n2}-0.5\times T_{n2}, C_{n3}+0.5\times T_{n3}, C_{n4}+0.5\times T_{n4})$
No9: $(C_{n1}-0.5\times T_{n1}, C_{n2}-0.5\times T_{n2}, C_{n3}+0.5\times T_{n3}, C_{n4}+0.5\times T_{n4})$ . . .
No81 . . .

As described above, since each of the items $C_{n1}$ to $C_{n4}$ can take three values, the number of combinations is $3^4=81$. It can be understood that one piece of training data $TD_n$ increases to the training data of 81 times. However, in acquiring the manufacturing control width in the training data on the site, in the case of a manufacturing control width obtained by confirming that only one item of the winding conditions is added or subtracted and the other items have the same values to obtain a good winding quality, the same training data is applied. That is, in the above example, it can be understood that the number of combinations is 3×N, and in a case where the number of items for which the manufacturing control width is set is 4, the training data $TD_n$ increases to the training data of 12 times.

In the above description, a case where each item of $C_{n1}$ to $C_{n4}$ has the manufacturing control width of $T_{n1}$ to $T_{n4}$ has been described. For example, in a case where the manufacturing control width $T_{n4}$ of the item $C_{n4}$ is set to 0, this is excluded from the computation of the combination. Accordingly, the number of combinations is $3^3=27$. In a case where the manufacturing control width $T_n$ is set in even one of the items $C_{n1}$ to $C_{n4}$, the number of combinations is $3^1=3$. Even in this case, it can be understood that one piece of training data $TD_n$ increases to the training data of 3 times.

According to the above-mentioned method, by adding the range of Expression 1 to the winding conditions, in a case where the number of items for which the allowable quality range is set is N, $3^N-1$ training data may be assigned as additional training data. It is possible to increase reliable additional training data $TD_{ad}$ on the basis of an actual manufacturing control width, and thus, it is possible to enhance the accuracy of a prediction value by learning using the training data $TD_n$ to which the additional training data $TD_{ad}$ is added. Before the machine learning unit 32 creates the learning model 34, it is preferable to provide a step of assigning the additional training data $TD_{ad}$.

In addition, in a case where the manufacturing control width is set on an actual manufacturing site, in a case where other items are set to the same values as they are, in the additional training data, only an item for which the manufacturing control width is set is accordingly added or subtracted, and other items are not changed. That is, it is preferable that only $3^N-1$ training data is assigned as additional training data. Further, a part of the $3^N-1$ training data may be assigned as additional training data.

<Winding Apparatus>

Figure 7:
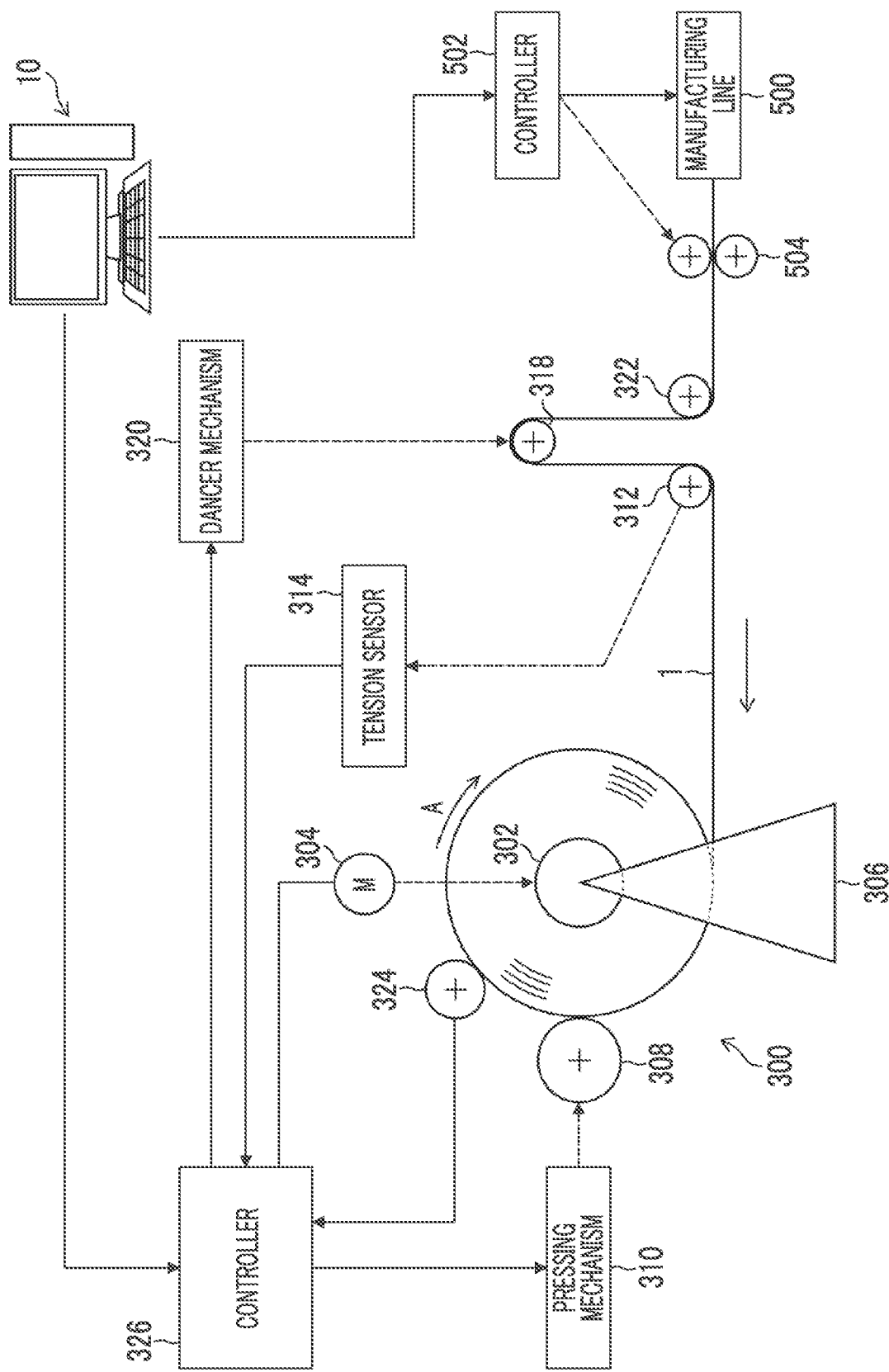
FIG. 7 is a schematic view of a winding apparatus that winds a web.

The winding apparatus of the embodiment will be described with reference to FIGS. 7 and 8. As shown in FIG. 7, the winding apparatus 300 is disposed on a downstream side of a manufacturing line 500. The manufacturing line 500 includes equipment for manufacturing a web 1, such as a coating device and a drying device. There is no particular limitation as long as it is equipment for manufacturing the web 1. In the manufacturing line 500, various processes for the web 1 are controlled by a controller 502. The controller 502 may control a rotation speed of a drive roller 504, and may adjust a web transport velocity.

The winding apparatus 300 includes a winding core 302, a motor 304, a support 306, a touch roller 308, a pressing mechanism 310, a tension measuring roller 312, a tension sensor 314, a dancer roller 318, a dancer mechanism 320, a guide roller 322, a length measuring roller 324, and a controller 326.

The winding core 302 is held to be rotationally moved by the support 306. The motor 304 rotationally drives the winding core 302. The controller 326 controls the rotation of the motor 304 to rotate the winding core 302 in an arrow A direction. The web 1 is wound around the winding core 302 by the rotation.

The web 1 means a flexible continuous strip-shaped member having a small film thickness, and includes a resin film, paper, metal, resin coated paper, synthetic paper, or the like. A material of the resin film may include, for example, polyolefin such as polyethylene or polypropylene, vinyl polymer such as polyvinyl acetate, polyvinyl chloride, or polystyrene, polyamide such as 6,6-nylon or 6-nylon, polyester such as polyethylene terephthalate, polyethylene-2,6-naphthalate, polycarbonate, cellulose acetate such as cellulose triacetate, or cellulose diacetate, or the like. The resin film may be provided with, for example, a function (for example, formation of a functional layer).

The tension measuring roller 312, the dancer roller 318, and the guide roller 322 are respectively disposed in the middle of a transport path of the web 1. The tension sensor 314 is connected to the tension measuring roller 312. Further, the dancer mechanism 320 that moves the dancer roller 318 is provided to the dancer roller 318, and gives a tension to the web with a constant force. A dancer position sensor measures a dancer position. The measured dancer position is input to the controller 326. The controller 326 may perform control on the basis of the measurement result to move the dancer roller 318, to thereby give a stable tension to the web 1.

The touch roller 308 has a rotation axis parallel to a rotation axis of the winding core 302, and is in contact with the web 1 wound around the winding core 302. The pressing mechanism 310 is provided to the touch roller 308. The pressing mechanism 310 is controlled by the controller 326, and presses the touch roller 308 toward the winding core 302 with a predetermined pressing force. The touch roller 308 may reduce a content rate of air that is inserted into the web 1 wound around the winding core 302. The pressing mechanism 310 is configured of, for example, an arm that supports the touch roller 308, an air cylinder that presses the arm, and the like. The controller 326 may control an air pressure of the air cylinder, and may adjust a pressing force of the touch roller 308 that presses the web.

The length measuring roller 324 is provided in contact with the web 1, and rotates in accordance with the movement of the web 1. An encoder (not shown) is provided to the length measuring roller 324. A signal from the encoder is input to the controller 326. The controller 326 may measure a feed length of the web 1 passing through the length measuring roller 324, which is a winding length of the web in this case. In a case where the winding length of the web reaches a predetermined value, the controller 326 stops the rotation of the winding core 302.

A winding diameter of the web is constantly computed and calculated by the controller 326. For example, the diameter may be obtained by measuring the length of the web necessary for one rotation of the winding core 302 and dividing the length of the web by 3.14.

In the embodiment shown in FIG. 7, a new winding parameter $P_{new}$ is input to the learning model 34 (not shown) of the condition calculation unit 30 of the winding condition generating apparatus 10. The learning model 34 of the condition calculation unit 30 calculates a new winding condition $C_{new}$ as a prediction value from the new winding parameter $P_{new}$.

The new winding parameter $P_{new}$ and the new winding condition $C_{new}$ are input to the controller 326 and the controller 502. By winding the web by the winding apparatus 300 on the basis of the new winding parameter $P_{new}$ and the new winding condition $C_{new}$, it is possible to produce a wound web that satisfies a target quality.

Next, a winding apparatus 400 different from that in FIG. 7 will be described with reference to FIG. 8. The same components as those of the winding apparatus 300 described above are denoted by the same reference numerals, and detailed description thereof may be omitted.

Unlike the winding apparatus 300, the winding apparatus 400 comprises an air nozzle 402 instead of the touch roller 308. By blowing air of the web 1 through a slit-shaped opening (not shown) formed in the air nozzle 402 to perform air-pressing, it is possible to remove the air inserted into the web 1 wound around the winding core 302 in a non-contact manner.

The air nozzle 402 is disposed such that a longitudinal direction of the opening of the air nozzle 402 and the rotation axis of the winding core 302 are parallel to each other. In the embodiment, the air nozzle 402 is disposed at a position where an air ejection direction is orthogonal to a main surface of the web 1. The air ejection direction of the air nozzle 402 may be inclined with respect to the position orthogonal to the main surface of the web 1.

A blower 404 including a filter, an air tank, and a compressor is connected to the air nozzle 402 through a pipe 406 as a generation source of air. The controller 326 may control the blower 404, and thus, may adjust the pressure of the air press that presses the web.

Figure 8:
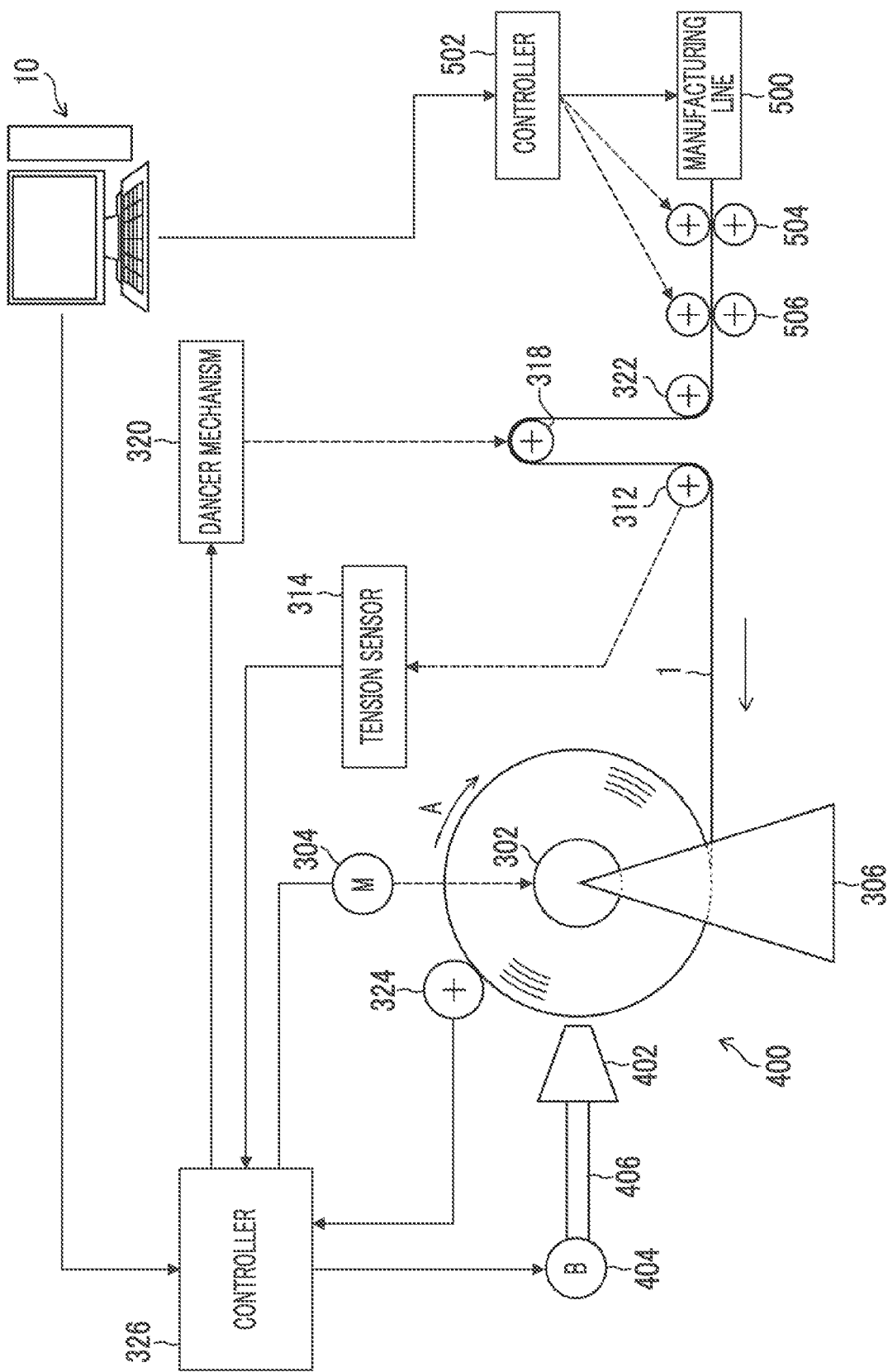
FIG. 8 is a schematic view of a winding apparatus different from that in FIG. 7.

In FIG. 8, knurling rollers 506 are disposed between the winding apparatus 400 and the drive rollers 504. The knurling rollers 506 are configured as a pair in order to press (nip) an edge portion of the web 1 in the thickness direction of the web 1. Two knurling rollers 506 are disposed at both edge portions of the web 1 to provide knurling at both edge portions of the web 1. The knurling is an unevenness formed on the web. A protrusion (not shown) is provided on one of the pair of knurling rollers 506 in order to form the unevenness on the web.

A nip pressure adjusting mechanism (not shown) is provided to the knurling roller 506. The nip pressure adjusting mechanism may adjust a distance between the knurling roller 506 and the web 1. The nip pressure adjusting mechanism may be controlled by the controller 502, and thus, may adjust a knurling height. Further, the knurling height may be adjusted by changing a shape, a size, or the like of the protrusion formed on the knurling roller 506.

In the embodiment shown in FIG. 8, a new winding parameter $P_{new}$ is input to the learning model 34 (not shown) of the condition calculation unit 30 of the winding condition generating apparatus 10. The learning model 34 of the condition calculation unit 30 calculates a new winding condition $C_{new}$ as a prediction value from the new winding parameter $P_{new}$.

The new winding parameter $P_{new}$ and the new winding condition $C_{new}$ are input to the controller 326 and the controller 502. By winding the web by the winding apparatus 400 on the basis of the new winding parameter $P_{new}$ and the new winding condition $C_{new}$, it is possible to produce a wound web that satisfies a target quality. As described above, the winding condition is calculated by the winding condition calculating method, and a method for winding the web by, for example, the winding apparatuses 300 and 400 using the calculated winding condition is provided.

The learning model 34 was evaluated using the winding condition generating apparatus 10 of the embodiment. As the winding parameters, the transport velocity, the winding length, and the web width were selected. As the winding conditions, the tension at the start of winding and the tension at the end of winding were selected. In a case where test data that was not used for learning was evaluated, a correct answer rate of the winding condition calculated from the learning model 34 showing a small difference between the prediction value generated by the learning model 34 and the actual manufacturing condition value was in a range of 80% to 95%. It can be understood that the learning model 34 is equivalent to the actual winding condition and can be used sufficiently.

By using the winding condition generating apparatus of the embodiment, compared with a case where winding conditions are set by trial using a normal manufacturing line, it is expected that it is possible to suppress the cost and time in a range of about 1/10 to 1/5.

In the embodiment described thus far, for example, a hardware structure of the processing units that execute various processes, such as the machine learning unit 32, the learning model 34, the controller 326, and the controller 502, corresponds to various processors as follows. The various processors include a central processing unit (CPU) which is a general-purpose processor that executes software (programs) and functions as a variety of processing units, a graphics processing unit (GPU) which is a processor specialized in image processing, a programmable logic device (PLD) that is a processor of which a circuit configuration is changeable after manufacturing, such as a field programmable gate array (FPGA), a dedicated electric circuit that is a processor having a circuit configuration that is dedicatedly designed for executing a specific process, such as an application specific integrated circuit (ASIC), or the like.

One processing unit may be configured by one processor among the various processors, or may be configured by the same type or different types of two or more processors (for example, a plurality of FPGAs, a combination of a CPU and an FPGA, or a combination of a CPU and a GPU). Further, the plurality of processing units may be configured by one processor. As an example in which the plurality of processing units are configured by one processor, first, as represented by a computer such as a client or a server, a form in which one processor is configured by a combination of one or more CPUs and software and the processor functions as a plurality of processing units, may be used. Second, as represented by a system-on-chip (System On Chip: SoC) or the like, a form in which a processor that realizes the functions of the entire system including a plurality of processing units with one integrated circuit (IC) chip may be used. As described above, the various processing units are configured using one or more of the above-described various processors as a hardware structure.

Furthermore, the hardware structure of the various processors is, more specifically, electric circuitry in which circuit elements such as semiconductor elements are combined.

Next, a winding defect level prediction value generating method will be described.

FIG. 9 is a schematic block diagram of a winding defect level prediction value generating apparatus. As shown in FIG. 9, a winding defect level prediction value generating apparatus 1010 comprises an input unit 1020, a prediction value calculation unit 1030, an output unit 1040, and a storage unit 1050.

The input unit 1020 has the same configuration as the input unit 20, the output unit 1040 has the same configuration as the output unit 40, and the storage unit 1050 has the same configuration as the storage unit 50.

The training data $TD_n$ includes conditions that satisfy a target winding quality in producing a winding roll, and additionally, includes information that causes various defect levels. As the training data $TD_n$, it is desirable that various types of winding data are extracted from a weak defect level to a strong defect level, in addition to high-quality data relating to production of a wound web.

The training data $TD_1$ includes input data $IN_1$ and output data $OUT_1$, and the training data $TD_2$ includes input data $IN_2$ and output data $OUT_2$. Each training data $TD_n$ includes input data $IN_n$ and output data $OUT_n$. The input data $IN_n$ included in the training data $TD_n$ is information for producing a wound web, and is acquired as information on a combination of the winding parameter $P_n$ and the winding condition $C_n$. The output data $OUT_n$ included in the training data $TD_n$ is information relating to the quality of the wound web, and is a winding defect level value including a winding misalignment value of a web and a damage defect level of the web.

The winding misalignment value (mm) of the web means a winding misalignment value (mm) in a width direction or a winding misalignment value (mm) in a circumferential direction in a case where a roll is transported after winding, or in a case where an impact is given by an impact assigning tester. The winding misalignment in the width direction, which is a main winding misalignment, is a misalignment in the middle of winding in the width direction. The circumferential misalignment is the amount of misalignment in a case where a straight line is written on an end face before winding misalignment and the straight line is measured after winding misalignment.

The damage defect of the web means a defect due to deformation and bending of the web, or due to occurrence of a mark thereon. The level of damage defect represents an intensity of the defect. The intensity of the defect is evaluated by sensory evaluation, for example, in a 10-level evaluation of level 1 to level 10, in which the stronger the deformation is, the higher the level of numerical value is classified.

In a case where the damage defect of the web has a plurality of types such as wrinkles, dents, and patterns, the level of each is handled as output data. For example, in a case where the defect has winding misalignment, a vertical wrinkle, a horizontal wrinkle, and a dent, the output data is configured of four types of a winding misalignment value, a vertical wrinkle level, a horizontal wrinkle level, and a dent level.

The prediction value calculation unit 1030 comprises a machine learning unit 1032 and a learning model 1034. The machine learning unit 32 is configured to perform machine learning using a block of the plurality of pieces of training data $TD_1$, training data $TD_2$, . . . , training data $TD_n$ as a training data group. In the machine learning unit 32, the input data $IN_n$ forms input training data. The output data $OUT_n$ becomes output training data.

The machine learning unit 1032 learns a correlation between input data $IN_n$ and output data $OUT_n$, which will be described later, from the training data $TD_n$.

Since the machine learning unit 32 creates the learning model 34 on the basis of the training data $TD_n$ that satisfies a target winding quality, it is possible to obtain a prediction value of output data $OUT_{new}$ (a winding misalignment value and a web damage defect level) from new input data $IN_{new}$ (a new winding parameter $P_{new}$ and a new winding condition $C_{new}$).

<Training Data>

A configuration of the training data $TD_n$ will be described. FIG. 10 is a table illustrating an example of a combination of input data $IN_n$ and output data $OUT_n$ that can be used for the training data TD. As shown in FIG. 10, the input data $IN_n$ includes winding parameters $P_n$ and winding conditions $C_n$. Each item of the winding parameters $P_n$ and the winding conditions $C_n$ corresponds to FIG. 3. The output data $OUT_n$ includes a winding misalignment value and a web damage defect level.

FIG. 11 is a table illustrating another example of a combination of input data $IN_n$ and output data $OUT_n$ that can be used for the training data TD. As shown in FIG. 11, each item of winding parameters $P_n$ and winding conditions $C_n$ corresponds to FIG. 4.

<Prediction Value Calculation Unit>

Figure 12:
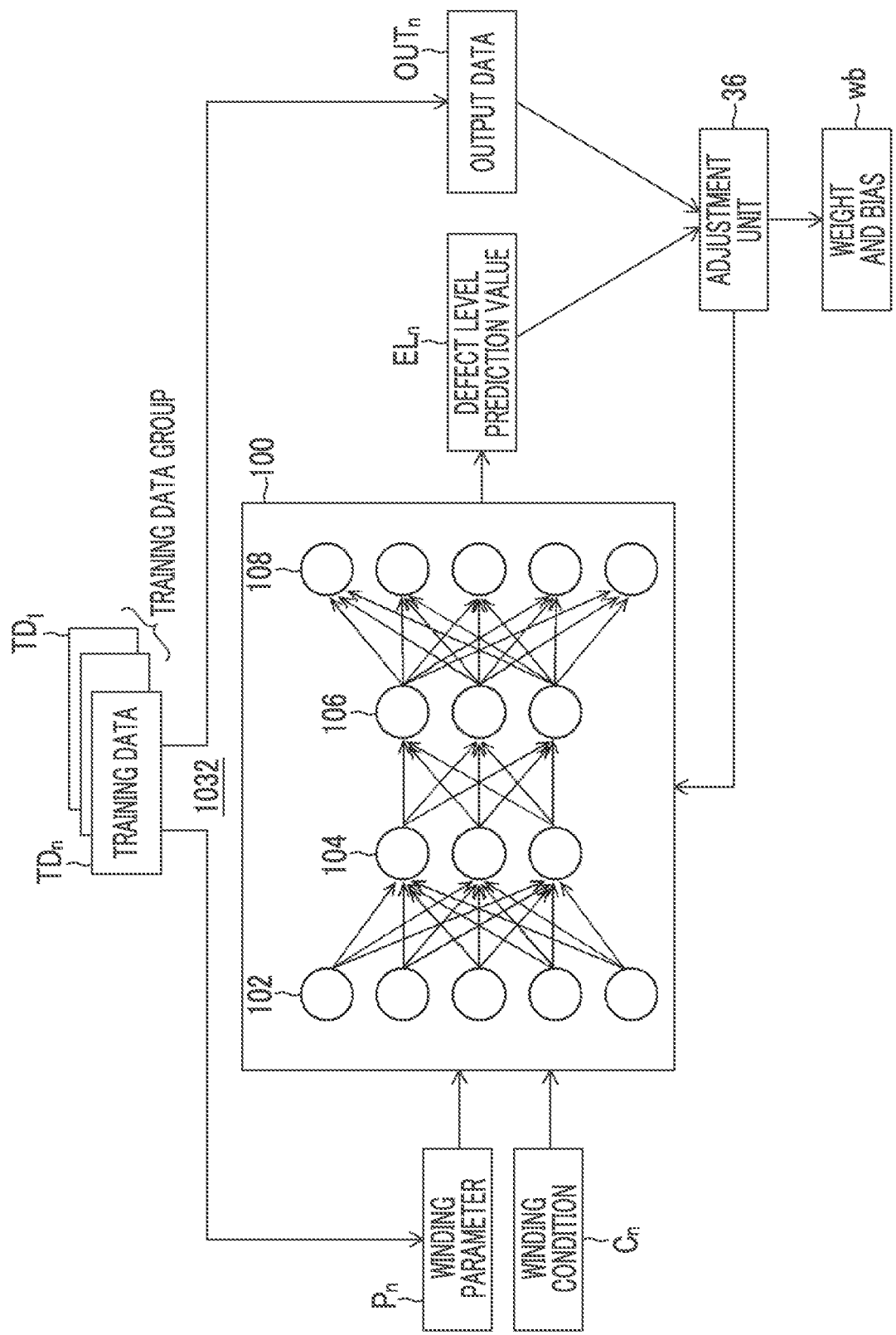
FIG. 12 is a schematic block diagram of the machine learning unit.

The machine learning unit 1032 and the learning model 1034 provided in the prediction value calculation unit 1030 will be described. FIG. 12 is a schematic configuration diagram of the machine learning unit 1032. As shown in FIG. 12, the machine learning unit 1032 includes the neural network 100 and deep learning. The neural network 100 is configured of a so-called three-layer neural network that comprises an input layer 102, a first interlayer 104, a second interlayer 106, and an output layer 108. The input layer 102 and the output layer 108 comprise five neurons. The first interlayer 104 and the second interlayer 106 each comprise three neurons. The neural network 100 is fully connected.

The winding parameters $P_n$ and the winding conditions $C_n$ are input to the input layer 102 as input data $IN_n$ from the training data $TD_n$.

The input data input to the input layer 102 is multiplied by a certain weight, is subjected to addition of a bias, and is then input to the first interlayer 104. The input data $IN_n$ input to the first interlayer 104 is multiplied by a certain weight, is subjected to addition of a bias, and is then input to the second interlayer 106. The input data $IN_n$ input to the second interlayer 106 is multiplied by a certain weight, is subjected to addition of a bias, and is then input to the output layer 108. In each neuron, the weight to be multiplied and the value of the bias to be added are set arbitrarily.

The defect level prediction value $EL_n$ corresponding to the winding parameters $P_n$ and the winding conditions $C_n$ is output from the output layer 108.

The defect level prediction value $EL_n$ is input to the adjustment unit 36. The output data $OUT_n$ corresponding to the winding parameters $P_n$ and the winding conditions $C_n$ from the training data $TD_n$ are input to the adjustment unit 36. The output data $OUT_n$ includes the winding misalignment value and the web damage defect level.

The adjustment unit 36 compares the defect level prediction value $EL_n$ with the output data $OUT_n$. The adjustment unit 36 obtains a value of a square sum error as a loss function, for example. The same operation is performed for all the training data $TD_1$ to $TD_n$ included in a prepared training data group. The adjustment unit 36 adjusts the weight and the bias so that a sum of the square sum errors of the defect level prediction value $EL_n$ and the output data $OUT_n$ is minimized. Learning is executed by repeating such adjustment a plurality of times. In a case where the learning is finished, data of the learned weights and biases wb are stored in a storage unit (not shown).

The configuration of the neural network 100 may be the same as the configuration of the neural network 100 included in the machine learning unit 32 shown in FIG. 5.

Figure 13:
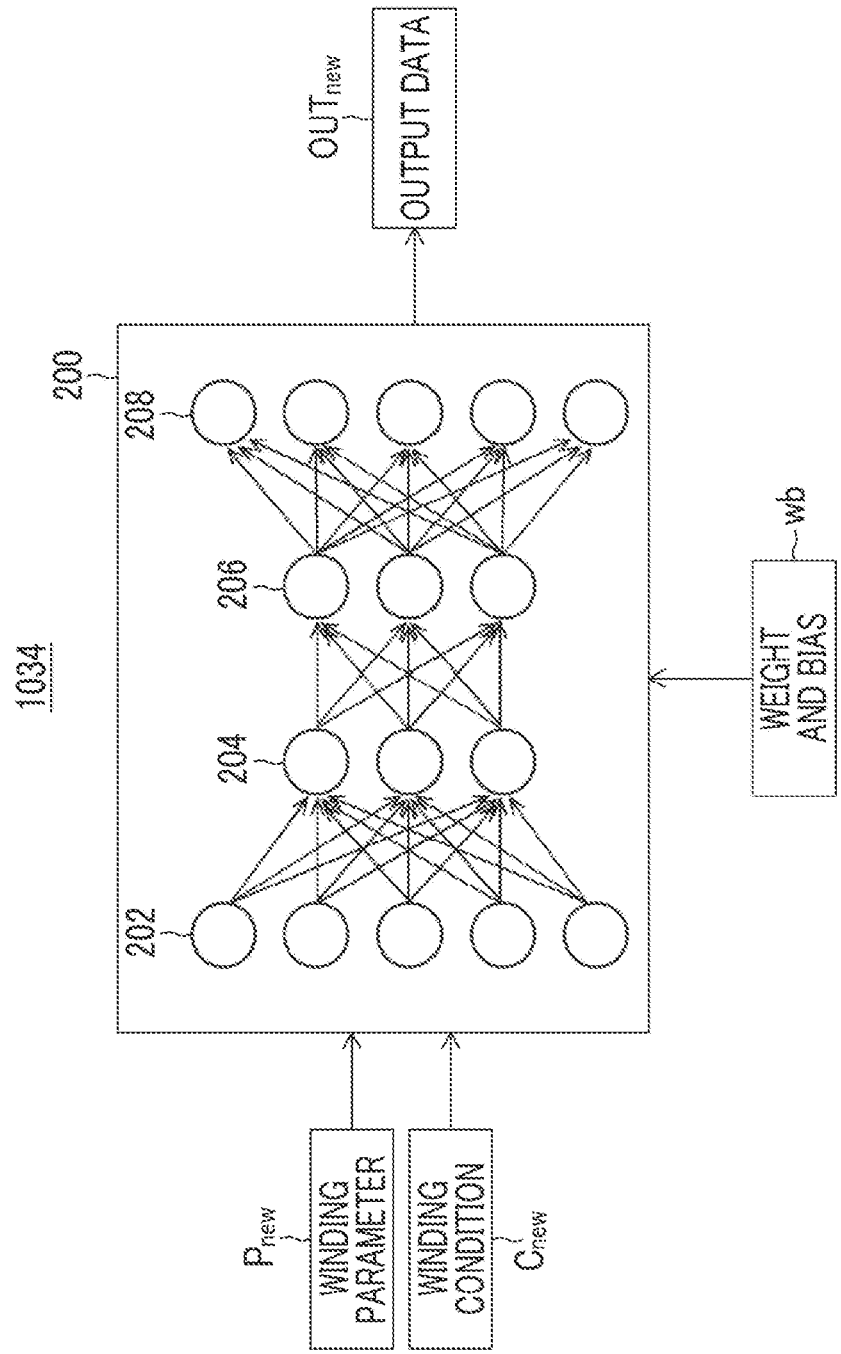
FIG. 13 is a schematic block diagram of the learning model.

FIG. 13 is a schematic configuration diagram of the learning model 1034. The learning model 1034 is configured such that a neural network 200 has a so-called three-layer neural network comprising an input layer 202, a first interlayer 204, a second interlayer 206, and an output layer 208. The input layer 202 and the output layer 208 comprise five neurons, respectively. The first interlayer 204 and the second interlayer 206 comprise three neurons, respectively. In the neural network 200, the weight and bias wb learned by the machine learning unit 1032 shown in FIG. 12 are set for each neuron.

As new input data $IN_{new}$, new winding parameters $P_{new}$ and new winding conditions $C_{new}$ are input to the input layer 202 of the neural network 200. In each neuron, the data of the weight and the bias wb are used so that the weight is multiplied and the bias is added, and the result is input to the output layer 208. New output data $OUT_{new}$ corresponding to the new input data $IN_{new}$ is calculated as a winding defect level prediction value for a new wound web, and is output from the output layer 208. That is, the winding misalignment value of the web that is newly wound and the damage defect level of the web may be predicted from the new winding parameters $P_{new}$ and the new winding conditions $C_{new}$.

In the embodiment, a case where the machine learning unit 1032 and the learning model 1034 use different neural networks has been described. The machine learning unit 1032 and the learning model 1034 may use a common neural network. Weights and biases are learned by the neural network of the machine learning unit 1032. Then, the learned weight and bias are set in the neural network of the machine learning unit 32. The machine learning unit 1032 may function as the learning model 1034.

The machine learning unit 1032 and the learning model 1034 may be physically separated. The machine learning unit 1032 and the learning model 1034 are not particularly limited as long as the learning result of the machine learning unit 1032 is used by the learning model 1034. Further, the learning model 1034 may be a model created by a device such as a separate server. That is, the learning model 1034 learned by a separate server or the like may be input to the prediction value calculation unit 1030 of the winding defect level prediction value generating apparatus 1010.

Next, an optimal winding condition generating apparatus and an optimal winding condition generating method will be described.

Figure 14:
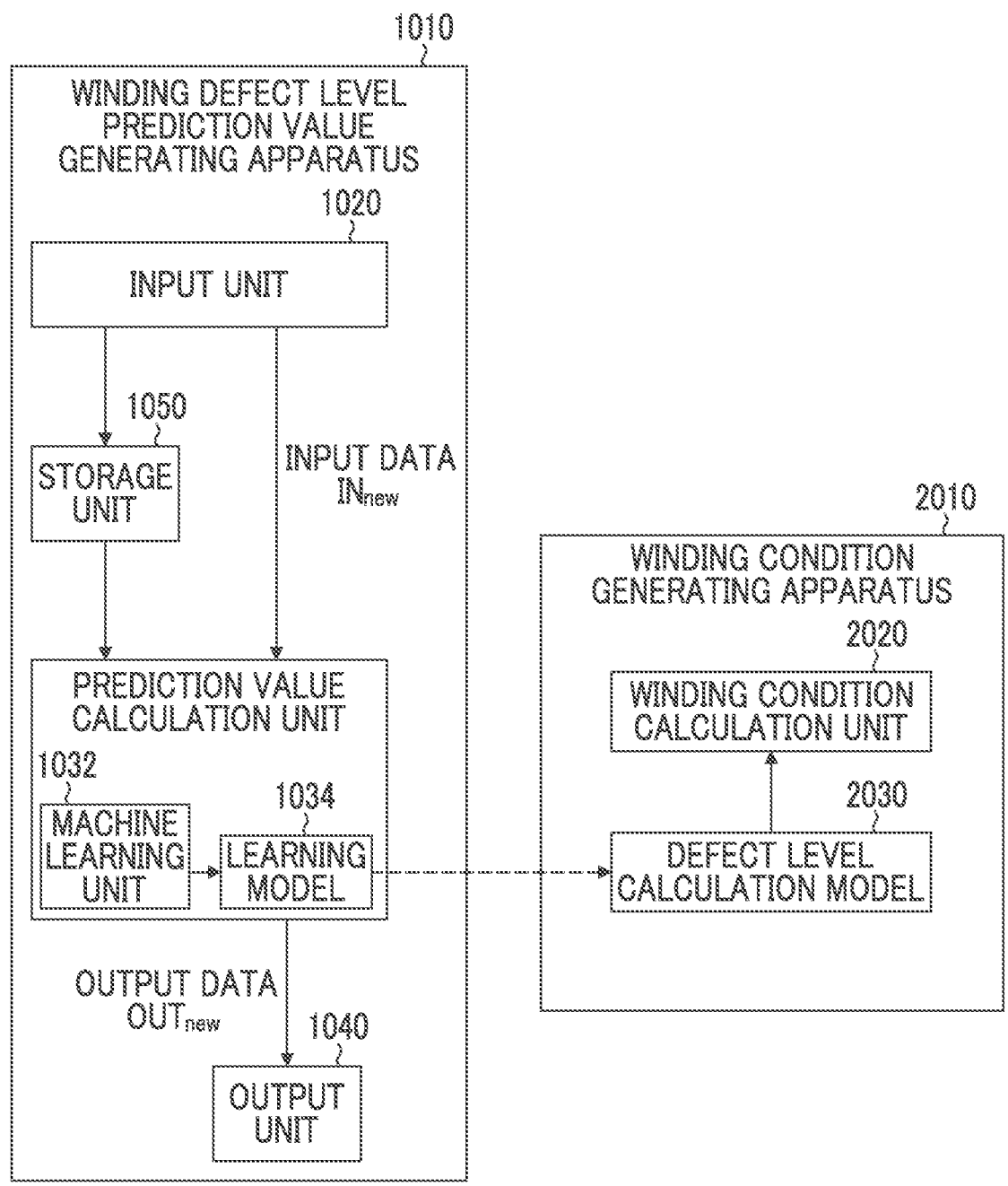
FIG. 14 is a schematic block diagram of the winding condition generating apparatus.

As shown in FIG. 14, a winding condition generating apparatus 2010 comprises a winding condition calculation unit 2020 and a defect level calculation model 2030. The defect level calculation model 2030 corresponds to the learning model 1034 in the winding defect level prediction value generating apparatus 1010, which is a model that receives winding conditions as an input and outputs a winding misalignment value of a web and a damage defect level of the web.

As described above, the defect level calculation model 2030 is a model learned to input data $IN_n$ (the winding parameters $P_n$ and the winding conditions $C_n$) as the training data $TD_n$ and to output a winding defect level prediction value as the output data $OUT_n$. On the other hand, it is not possible to calculate the winding conditions $C_n$ included in the input data $IN_n$ in order to reduce the winding defect level prediction value as the output data $OUT_n$, that is, to improve the defect level.

The winding condition calculation unit 2020 is configured to perform evolutionary computation of design variables and to perform arithmetic processing so as to minimize an objective function. Here, the evolutionary computation means computation by an optimal method such as a genetic algorithm.

The winding condition calculation unit 2020 may perform evolutionary computation until an objective function is minimized, using each sum of the web winding misalignment values and the web damage defect levels as the objective function, and using the winding conditions as design variables.

In the embodiment, the winding condition calculation unit 2020 changes the design variable, and outputs the winding conditions, which are the design variables in a case where the objective function becomes minimum, as the winding conditions.

The winding condition calculation unit 2020 may calculate the winding conditions $C_{new}$ for improving the defect level.

In the embodiment described thus far, for example, a hardware structure of the processing units that execute various processes, such as the machine learning unit 1032, the learning model 1034, the winding condition calculation unit 2020, and the defect level calculation model 2030, are various processors as described below. The various processors include a central processing unit (CPU) which is a general-purpose processor that executes software (programs) and functions as a variety of processing units, a graphics processing unit (GPU) which is a processor specialized in image processing, a programmable logic device (PLD) that is a processor of which a circuit configuration is changeable after manufacturing, such as a field programmable gate array (FPGA), a dedicated electric circuit that is a processor having a circuit configuration that is dedicatedly designed for executing a specific process, such as an application specific integrated circuit (ASIC), or the like.

One processing unit may be configured by one processor among the various processors, or may be configured by the same type or different types of two or more processors (for example, a plurality of FPGAs, a combination of a CPU and an FPGA, or a combination of a CPU and a GPU). Further, the plurality of processing units may be configured by one processor. As an example in which the plurality of processing units is configured by one processor, first, as represented by a computer such as a server and a client, a form in which one processor is configured by a combination of one or more CPUs and software and the processor functions as a plurality of processing units may be used. Second, as represented by a system-on-chip (System On Chip: SoC) or the like, a form in which a processor that realizes the functions of the entire system including a plurality of processing units with one integrated circuit (IC) chip may be used. As described above, the various processing units are configured using one or more various processors as a hardware structure.

EXPLANATION OF REFERENCES

10: Winding condition generating apparatus
20: Input unit
30: Condition calculation unit
32: Machine learning unit
34: Learning model
36: Adjustment unit
40: Output unit
50: Storage unit
100: Neural network
102: Input layer
104: First interlayer
106: Second interlayer
108: Output layer
200: Neural network
202: Input layer
204: First interlayer
206: Second interlayer
208: Output layer
300: Winding apparatus
302: Winding core
304: Motor
306: Support
308: Touch roller
310: Pressing mechanism
312: Tension measuring roller
314: Tension sensor
318: Dancer roller
320: Dancer mechanism
322: Guide roller
324: Length measuring roller
326: Controller
400: Winding apparatus
402: Air nozzle
404: Blower
406: Pipe
500: Manufacturing line
502: Controller
504: Drive roller
506: Knurling roller
1010: Winding defect level prediction value generating apparatus
1020: Input unit
1030: Prediction value calculation unit
1032: Machine learning unit
1034: Learning model
1040: Output unit
1050: Storage unit
2010: Winding condition generating apparatus
2020: Winding condition calculation unit
2030: Defect level calculation model
A: Arrow

What is claimed is:

1. A winding condition generating apparatus comprising at least one processor configured to:
   calculate a winding condition of a new wound web from a winding parameter of the new wound web, using a learning model created by machine learning with a combination of a winding parameter and a winding condition in producing a wound web that satisfies a target winding quality as training data; and
   output the winding condition,
   wherein the winding parameter includes a web width, a web transport velocity, and a web winding length,
   wherein the winding condition includes a tension of the web at the start of winding and a tension of the web at the end of winding, and
   wherein in a case where with respect to a set of the winding conditions obtained in producing the web, which is the training data, a value of each winding condition item is denoted by $C_{ni}$, an allowable quality range value set to the value $C_{ni}$ of the winding condition item is denoted by $T_{ni}$ and the number of items to which the allowable quality range value $T_{ni}$ is set is denoted by N, a range obtained by the following Equation for each item is added to the winding conditions, and $3^N-1$ pieces of the training data or a part of the training data is assigned as additional training data, $$C_k = C_{ni} \pm 0.5 \times T_{ni}.$$

2. The winding condition generating apparatus according to claim 1,
   wherein the winding parameter includes at least one of a diameter of a winding core around which the web is wound, a name of a line in which the wound web is produced, a thickness of the web, a difference between a maximum thickness and a minimum thickness in a web width direction, or a modulus of elasticity of the web, and
   wherein the winding condition includes at least one of a diameter of the web at the end of winding, a knurling height, a pressure of an air press that presses the web, or a pressing force of a touch roller that presses the web.

3. The winding condition generating apparatus according to claim 1,
   wherein the target winding quality is non-occurrence of a web winding misalignment defect and a web damage defect.

4. The winding condition generating apparatus according to claim 1,
   wherein the machine learning includes a neural network and deep learning.

5. The winding condition generating apparatus according to claim 1,
   wherein the winding condition includes any one of a tension function expressed with respect to a radial coordinate of a winding roll, an air press pressure function for pressing the web, or a function of a pressing force of a touch roller.

6. The winding condition generating apparatus according to claim 1,
   wherein the at least one processor is configured to cause the learning model to perform the machine learning using the combination of the winding parameter and the winding condition in producing the wound web that satisfies the target winding quality, as the training data.

7. A winding apparatus that winds a web using the winding condition calculated by the winding condition generating apparatus according to claim 1.

8. A winding defect level prediction value generating apparatus comprising at least one processor configured to:
   calculate a winding defect level prediction value from a winding parameter and a winding condition of a new wound web, using a learning model created by machine learning with a combination of a winding parameter, a winding condition and a winding defect level value in producing a wound web as training data; and
   output the winding defect level prediction value,
   wherein the winding parameter includes at least one of a web width, a web transport velocity, a web winding length, a diameter of a winding core around which the web is wound, a name of a line in which the wound web is produced, a web thickness, a difference between a maximum thickness and a minimum thickness in a web width direction, or a modulus of elasticity of the web,
   wherein the winding condition includes at least one of a tension of the web at the start of winding, a tension of the web at the end of winding, a knurling height, a pressure of an air press for pressing the web, or a pressing force of a touch roller for pressing the web,
   wherein the winding defect level prediction value includes a web winding misalignment value and a web damage defect level, and
   wherein in a case where with respect to a set of the winding conditions obtained in producing the web, which is the training data, a value of each winding condition item is denoted by $C_{ni}$, an allowable quality range value set to the value $C_{ni}$ of the winding condition item is denoted by Tin and the number of items to which the allowable quality range value $T_{ni}$ is set is denoted by N, a range obtained by the following Equation for each item is added to the winding conditions, and $3^N-1$ pieces of the training data or a part of the training data is assigned as additional training data, $$C_k = C_{ni} \pm 0.5 \times T_{ni}.$$

9. A winding condition generating apparatus comprising:
   a defect level calculation model that is a learning model in the winding defect level prediction value generating apparatus according to claim 8, receives an input of a winding condition, and outputs a web winding misalignment value and a web damage defect level; and
   at least one processor configured to:
   change using each sum of the web winding misalignment values and the web damage defect levels that are the output of the defect level calculation model as an objective function, and using the winding condition as a design variable, the design variable through evolutionary computation until the objective function becomes minimum; and
   output a winding condition that is a design variable in a case where the objective function becomes minimum, as the winding condition.

10. A winding condition calculating method at least comprising:
    a step of creating a learning model by performing machine learning using a combination of a winding parameter and a winding condition in producing a wound web that satisfies a target winding quality as training data;
    a step of inputting a winding parameter of a new wound web; and a step of calculating a winding condition of the new wound web using the learning model from the winding parameter, wherein the winding parameter includes a web width, a web transport velocity, and a web winding length, and wherein the winding condition includes a tension of the web at the start of winding and a tension of the web at the end of winding;

further comprising:

a step of adding, in a case where with respect to a set of the winding conditions obtained in producing the web, which is the training data, a value of each winding condition item is denoted by $C_{ni}$, an allowable quality range value set to the value $C_{ni}$ of the winding condition item is denoted by $T_{ni}$ and the number of items to which the allowable quality range value $T_{ni}$ is set is denoted by N, a range obtained by the following Equation for each item, to the winding conditions, and assigning $3^N-1$ pieces of the training data or a part of the training data, as additional training data, $$C_k = C_{ni} \pm 0.5 \times T_{ni}.$$

11. The winding condition calculating method according to claim 10, wherein the winding parameter includes at least one of a diameter of a winding core around which the web is wound, a name of a line in which the wound web is produced, a thickness of the web, a difference between a maximum thickness and a minimum thickness in a web width direction, or a modulus of elasticity of the web, and wherein the winding condition includes at least one of a diameter of the web at the end of winding, a knurling height, a pressure of an air press that presses the web, or a pressing force of a touch roller that presses the web.

12. The winding condition calculating method according to claim 10, wherein the winding condition includes any one of a tension function expressed with respect to a radial coordinate of a winding roll, an air press pressure function for pressing the web, or a function of a pressing force of a touch roller.

13. A winding method comprising:

a step of calculating a winding condition using the winding condition calculating method according to claim 10; and a step of winding a web using the calculated winding condition.

14. A winding defect level prediction value generating method at least comprising:

a step of creating a learning model that machine-learns training data of a combination having a winding parameter and a winding condition in producing a winding roll as an input and having a winding defect level value as an output;

a step of inputting a winding parameter and a winding condition of a new wound web; and a step of calculating a winding defect level prediction value of the new wound web from the winding parameter and the winding condition, using the learning model, wherein the winding parameter includes at least one of a web width, a web transport velocity, a web winding length, a diameter of a winding core around which the web is wound, a name of a line in which the wound web is produced, a web thickness, a difference between a maximum thickness and a minimum thickness in a web width direction, or a modulus of elasticity of the web, wherein the winding condition includes at least one of a tension of the web at the start of winding, a tension of the web at the end of winding, a knurling height, a pressure of an air press for pressing the web, or a pressing force of a touch roller for pressing the web, and wherein the winding defect level prediction value includes a web winding misalignment value and a web damage defect level, further comprising:

a step of adding, in a case where with respect to a set of the winding conditions obtained in producing the web, which is the training data, a value of each winding condition item is denoted by $C_{ni}$, an allowable quality range value set to the value $C_{ni}$ of the winding condition item is denoted by $T_{ni}$ and the number of items to which the allowable quality range value $T_{ni}$ is set is denoted by N, a range obtained by the following Equation for each item, to the winding conditions, and assigning $3^N-1$ pieces of the training data or a part of the training data, as additional training data, $$C_k = C_{ni} \pm 0.5 \times T_{ni}.$$

15. A winding condition generating method comprising:

a step of creating a defect level calculation model, which is a learning model in the winding defect level prediction value generating apparatus according to claim 9, and which receives an input of a winding condition, and outputs a web winding misalignment value, and a web damage defect level; and a step of calculating the winding condition, wherein in the step of calculating the winding condition, using each sum of the web winding misalignment values and the web damage defect levels that are the output of the defect level calculation model as an objective function, and using the winding condition as a design variable, the design variable is changed through evolutionary computation until the objective function becomes minimum, and a winding condition that is a design variable in a case where the objective function becomes minimum is output as the winding condition.

* * * * *